April 12, 1938.    C. CAMPBELL    2,113,612
CALCULATING MACHINE
Filed Jan. 10, 1934    13 Sheets-Sheet 1

INVENTOR
Charles Campbell.
ATTORNEY

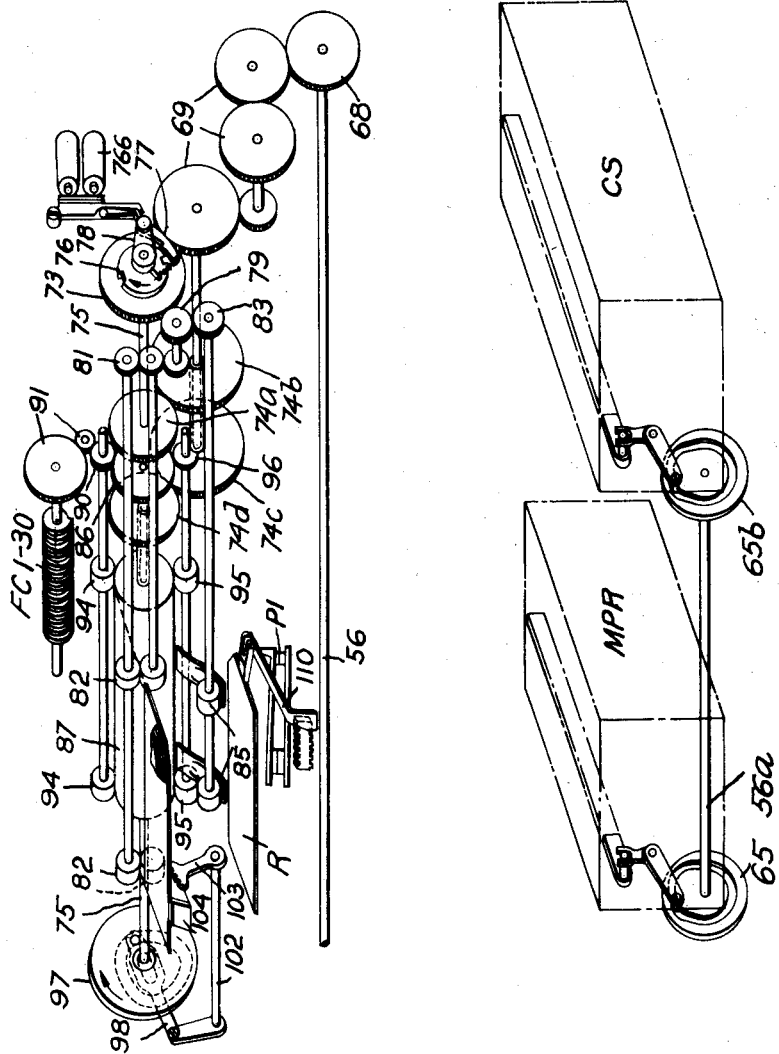

April 12, 1938.  C. CAMPBELL  2,113,612
CALCULATING MACHINE
Filed Jan. 10, 1934   13 Sheets-Sheet 3
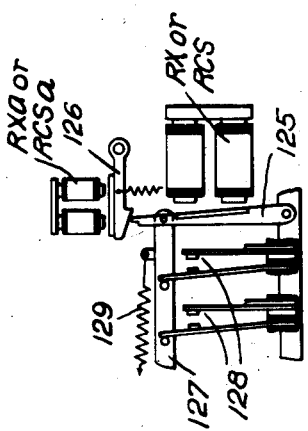
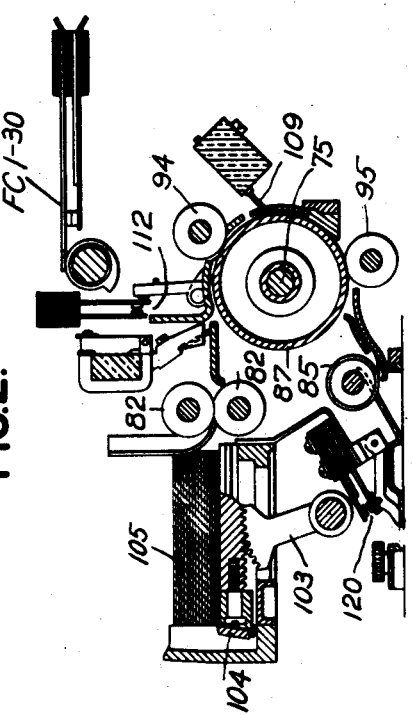
INVENTOR
ATTORNEY

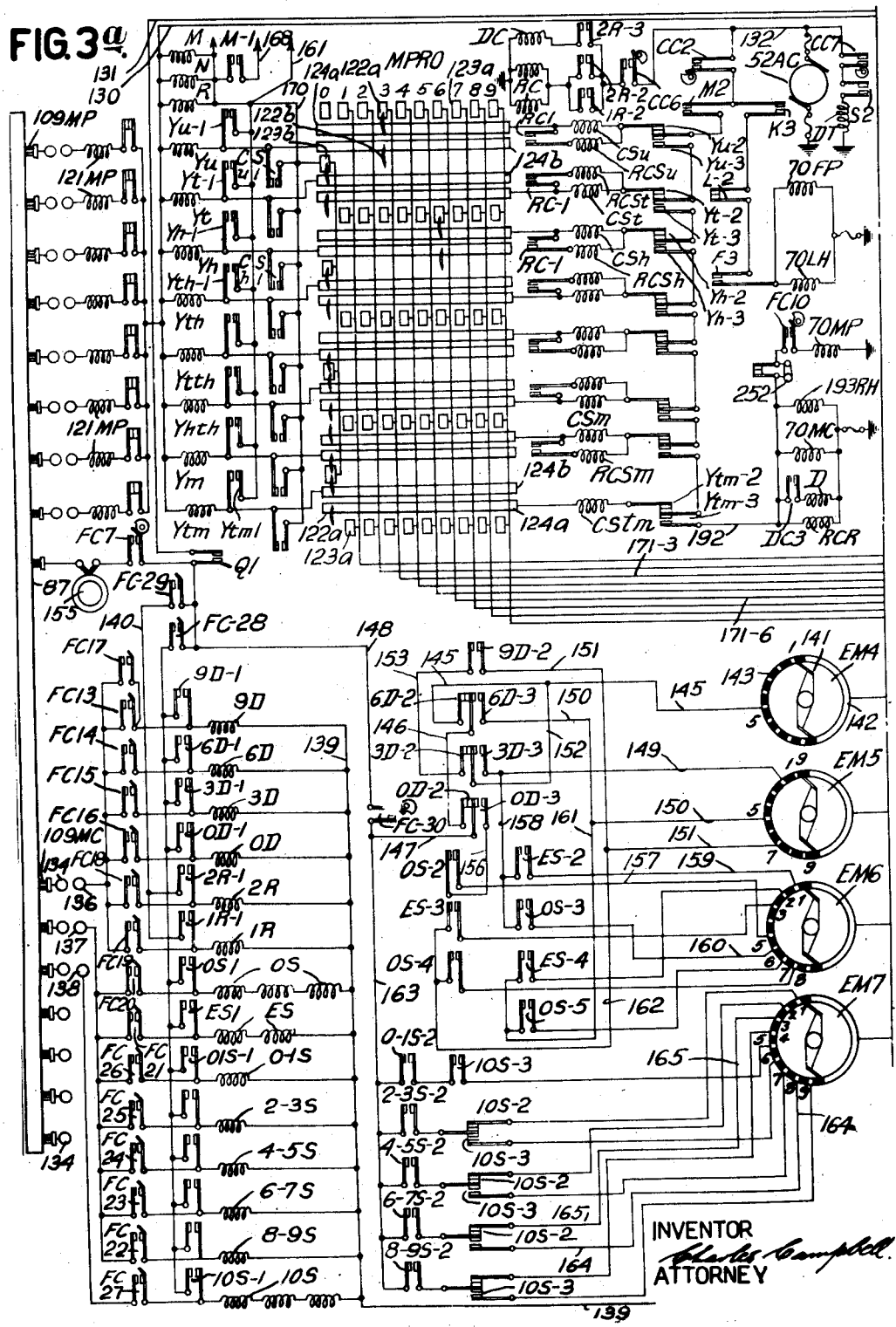

April 12, 1938.     C. CAMPBELL     2,113,612
CALCULATING MACHINE
Filed Jan. 10, 1934     13 Sheets-Sheet 5
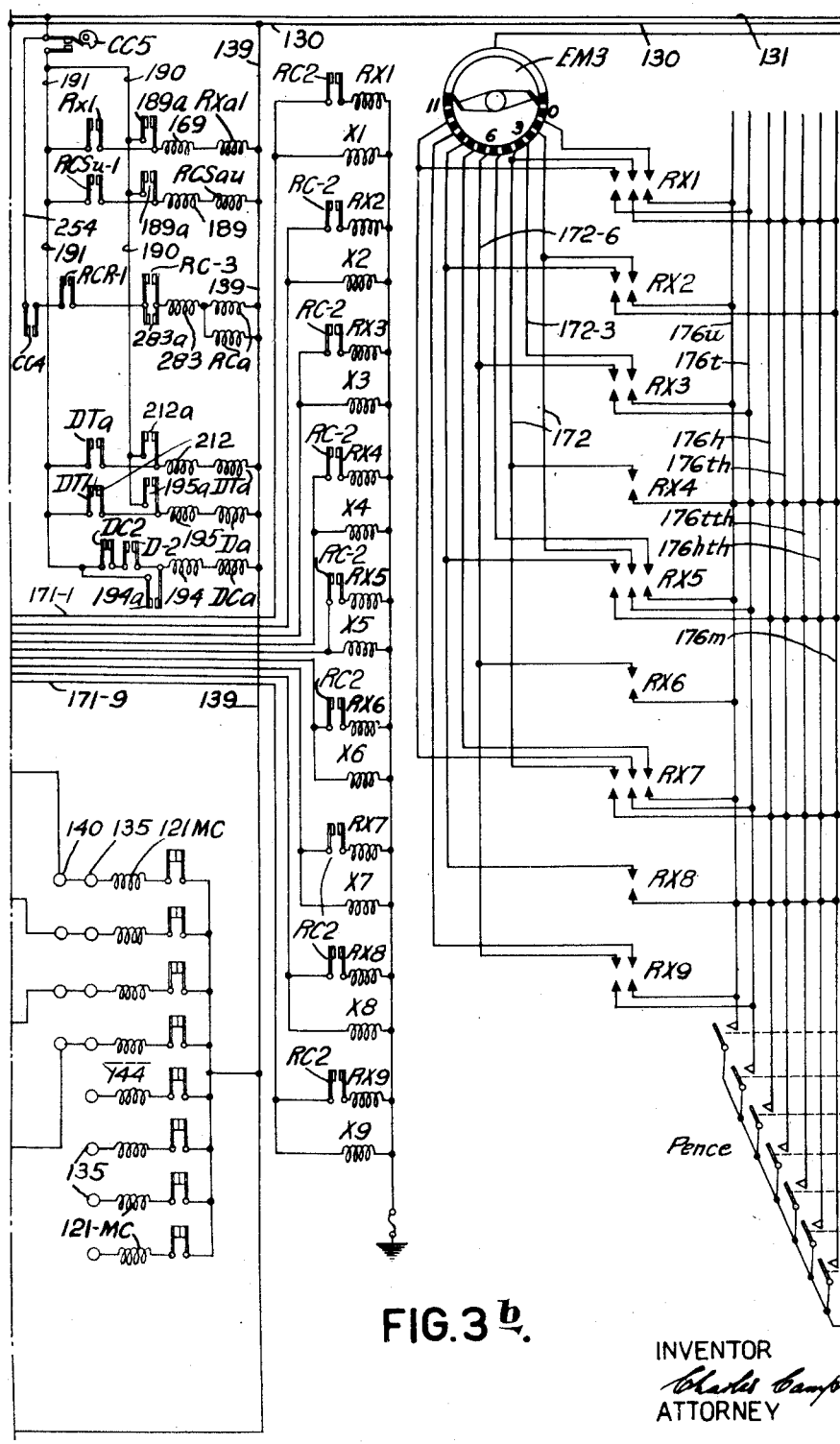
FIG.3 ᵇ.
INVENTOR
Charles Campbell
ATTORNEY

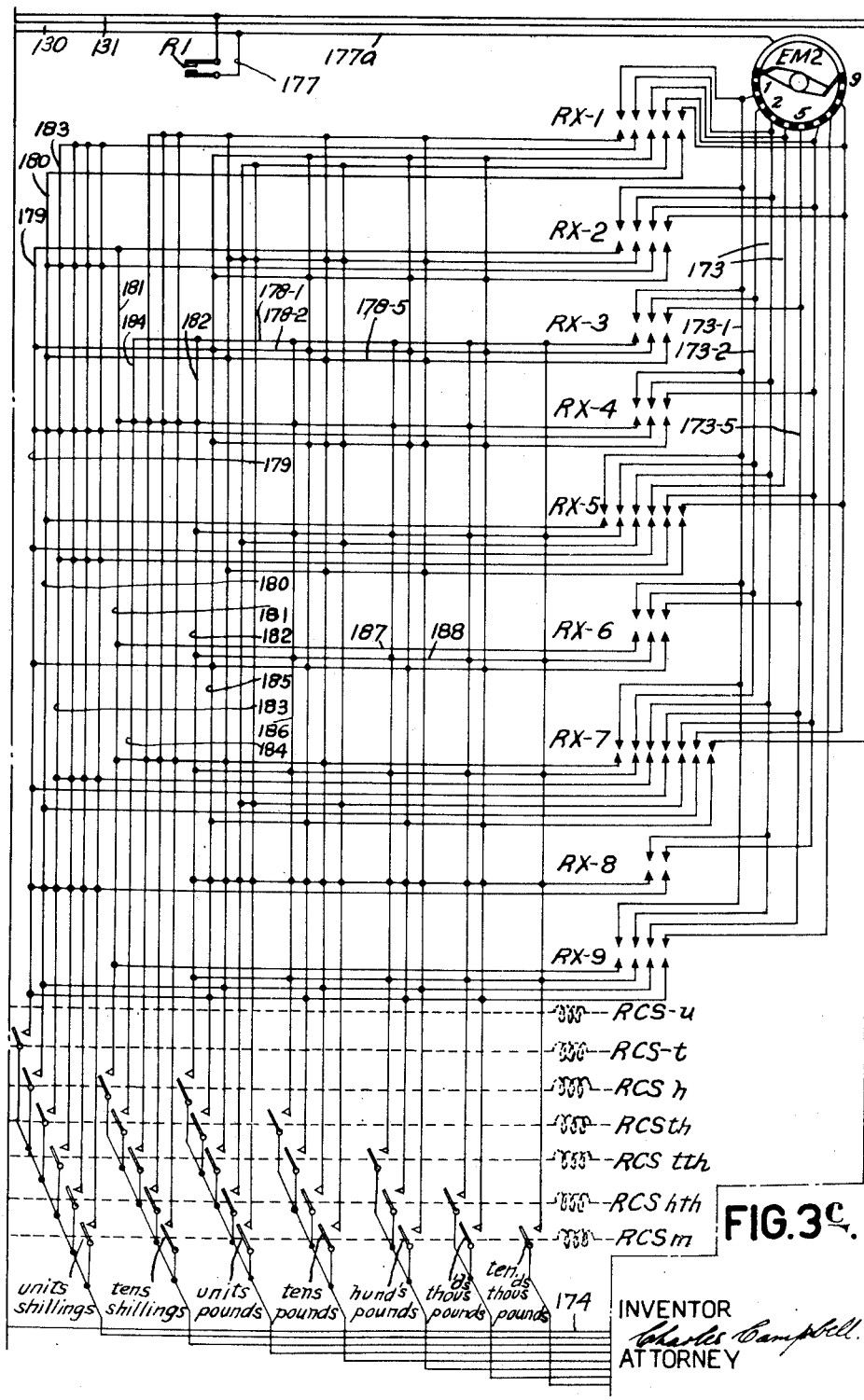
FIG.3ᶜ.

April 12, 1938.  C. CAMPBELL  2,113,612
CALCULATING MACHINE
Filed Jan. 10, 1934  13 Sheets-Sheet 9

INVENTOR
Charles Campbell
ATTORNEY

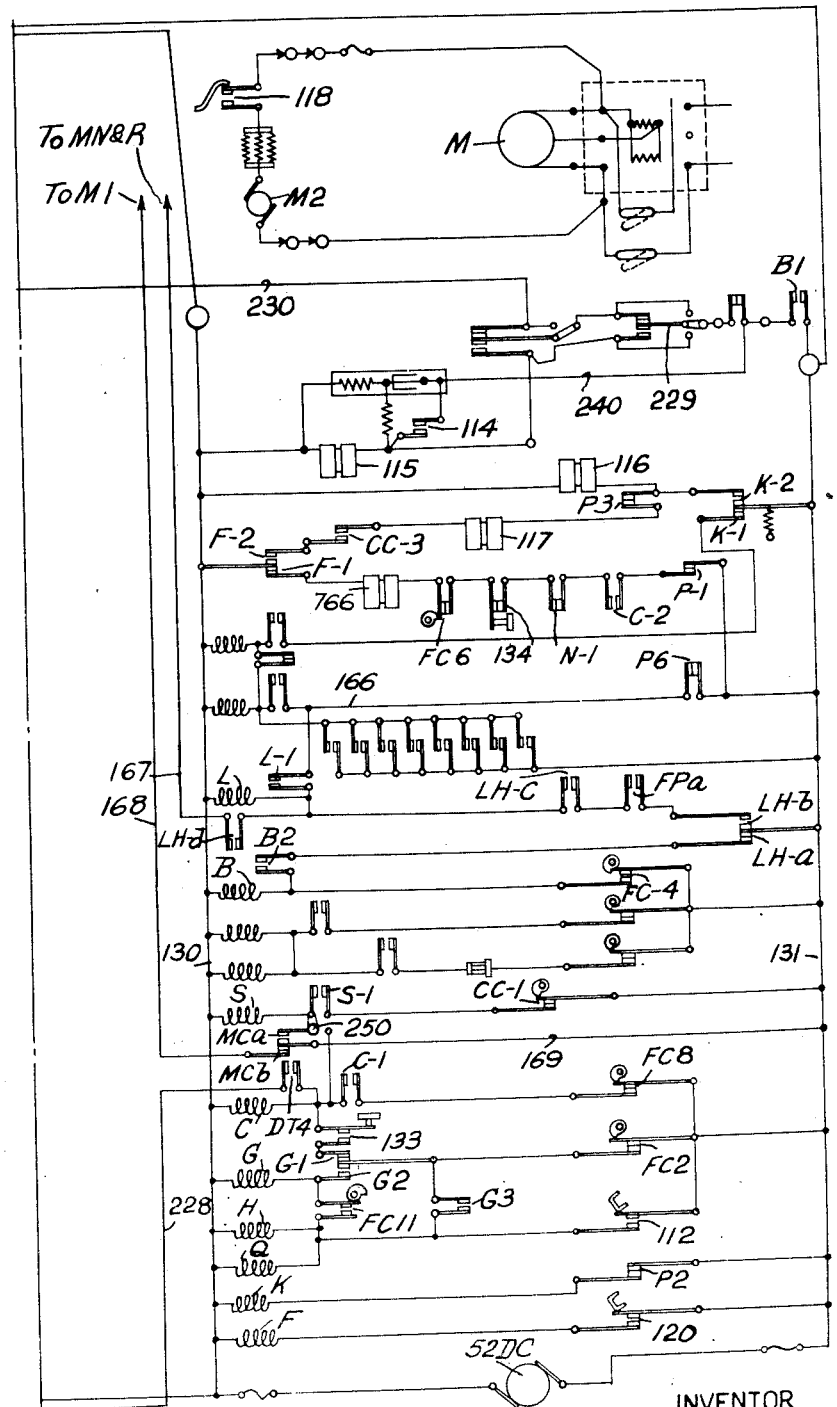
FIG.3ʰ.

April 12, 1938. C. CAMPBELL 2,113,612
CALCULATING MACHINE
Filed Jan. 10, 1934 13 Sheets-Sheet 12

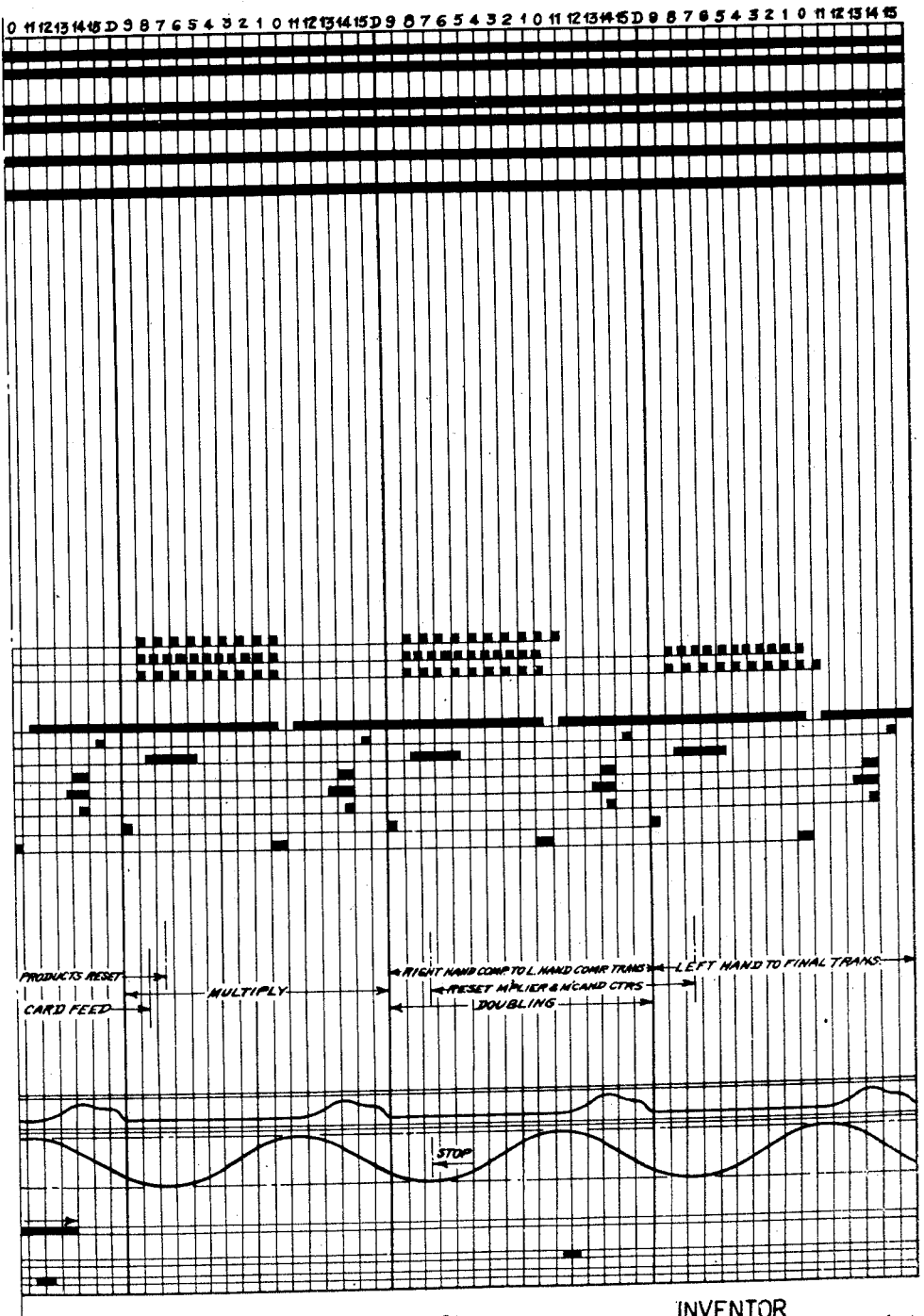
FIG.4ª.

Patented Apr. 12, 1938

2,113,612

UNITED STATES PATENT OFFICE 2,113,612

CALCULATING MACHINE

Charles Campbell, London, England, assignor to International Business Machines Corporation, New York, N. Y., a corporation of New York Application January 10, 1934, Serial No. 706,104
In Great Britain January 13, 1933

9 Claims. (Cl. 235—61.6)

This invention relates to calculating machines for performing calculations involving amounts expressed in terms of a non-uniform notation, such, for example, as amounts expressed in terms of pounds, shillings, and pence.

By the term "uniform notation" is meant a notation such as the decimal notation, having a single base common to all the denominations of an amount and by the term "non-uniform notation" is meant a notation having more than one base each of which is related to a particular denomination or denominations.

In certain kinds of calculations, in particular multiplication, the calculation and/or the mechanism required to perform it may be greatly simplified by taking advantage of the fact that an amount expressed in terms of a uniform notation can be multiplied or divided by the base of the notation by altering the position of the decimal point. Such an alteration will be referred to hereinafter as a column shift operation and is not possible when an amount expressed in terms of a non-uniform notation is involved.

It has been proposed to provide translating mechanism for converting an amount expressed in pounds, shillings and pence into terms of pounds and decimals of a pound and also to provide translating mechanism for effecting the converse operation. An amount expressed in terms of pounds, shillings and pence cannot, in general, be expressed exactly as decimals of a pound so that a small error will be made during the conversion. If the amount is to be multiplied, the decimalization must be carried far enough to ensure that the error is negligible. Thus if a sterling amount is to be multiplied by an eight figure number, the decimilization must be carried to eleven figures of decimals at least or to twelve figures if the product is obtained as the sum of a plurality of partial products or to thirteen or fourteen figures, if a series of decimal products are to be added together to form an accurate sum. This involves complicated translating mechanism and necessitating larger capacity in the calculating mechanism itself.

According to the present invention there is provided, in a calculating machine, means for entering an amount expressed in a non-uniform notation, and translating mechanism operable under the control of the entering means to convert the amount into the sum or difference of an amount which can be accurately expressed in a uniform notation and a remainder which cannot be expressed in the said uniform notation. It is a feature of the invention to arrange the translating mechanism to effect the conversion of the first of the amounts forming the sum or difference into the said uniform notation. Thus, when the amount entered is in pounds, shillings and pence, the translating mechanism may be arranged to convert the amount into the sum of a decimal amount of pounds, shillings and quarter-shillings, and a remainder of either nothing or one penny or twopence. Alternatively, the translating mechanism may be arranged to convert the amount into either a decimal amount or the sum or the difference of a decimal amount of pounds, shillings and quarter-shillings and a remainder of one penny.

It is a feature of this invention to provide a multiplying machine comprising in combination means for entering two factors to be multiplied together of which one is expressed in a non-uniform notation; translating mechanism for converting the said factor into the sum or difference of an amount expressed in a uniform notation and a remainder, multiplying mechanism for obtaining the product of the amount in the uniform notation and the other factor, additional multiplying mechanism for obtaining the product of the remainder and the other factor, means for translating one of the products into the notation of the other and means for obtaining the sum or difference of the two products. Conveniently, the two products are obtained each in a separate accumulator and there is provided means for reading the uniform product out of its accumulator, and entering it into the other accumulator, which means constitutes a re-translating means so that the uniform product is converted into terms of the non-uniform notation and added to the other product in one operation.

When the non-uniform amount is expressed in terms of pounds, shillings and pence, the conversion is preferably, as explained above, into a decimal amount and the remainder of one penny or twopence. The additional multiplying mechanism preferably includes means operable when the remainder is either one penny or twopence, to express the product of the appropriate factor and one penny in terms of pounds, shillings and pence, and means operable to add the product thus obtained to itself when the remainder is twopence. The entering means may be constituted by a device for reading perforated records. The reading device may be of the kind in which the records are read while in motion and impulses are generated at times representative of the amounts read from the record and the translating mechanism may be adjustable by impulses transmitted to it from the reading device and operable to emit impulses timed to represent at least a portion, for example the decimal portion, of the converted uniform amount and the remainder.

The above described process of converting an amount expressed in a non-uniform notation into the sum or difference of two amounts is applicable to calculating machines other than multiplying machines. It may, for example, be applied, with advantage in certain cases, to means for translating an amount in a non-uniform notation into an amount in the decimal notation, by converting the amount into an amount accurately expressed in the decimal notation and a remainder which is separately converted, to the desired degree of accuracy, into the decimal notation, and then adding together the two amounts so obtained.

A record-card controlled multiplying machine embodying the present invention will now be described, by way of example only, with reference to the accompanying drawings in which:—

Figures 1 and 1a show diagrammatically various parts of the machine and the drive to those parts;

Figure 2 is a section through card-feeding and reading mechanism of the machine;

Figure 4:
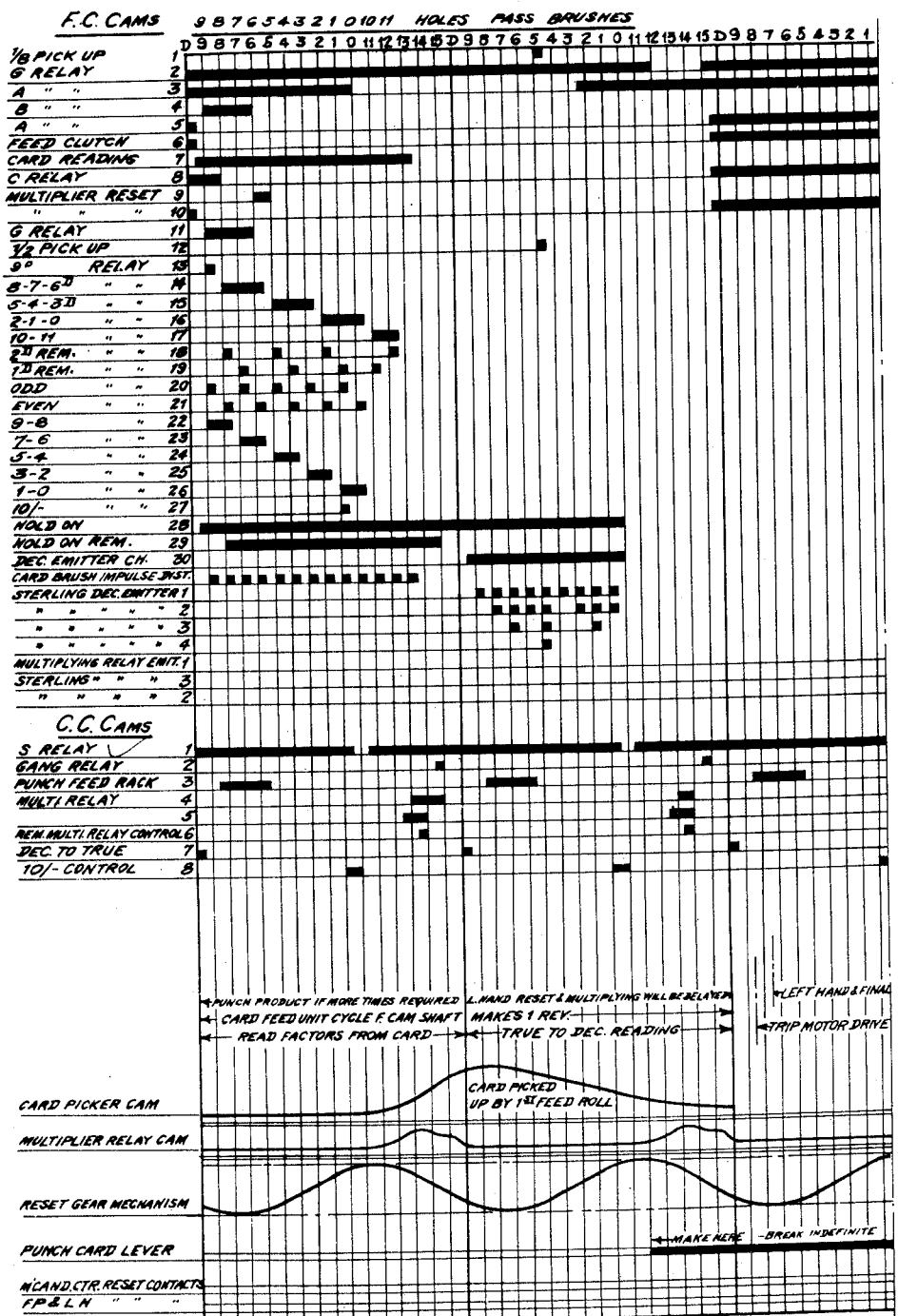

Figures 3a to 3h arranged from left to right in that order, form a circuit diagram for the machine;

Figures 4 and 4a are a timing diagram for the machine, and

Figure 5 shows diagrammatically, an electromagnetic relay in the machine.

Like reference numerals indicate like parts in all the figures of the drawings.

The machine illustrated in the drawings is of the kind described in the Cunningham United States Patent No. 1,933,714. The general arrangement of the machine will be described briefly first, to assist in understanding the present improvements.

*General arrangement*

Figure 1:
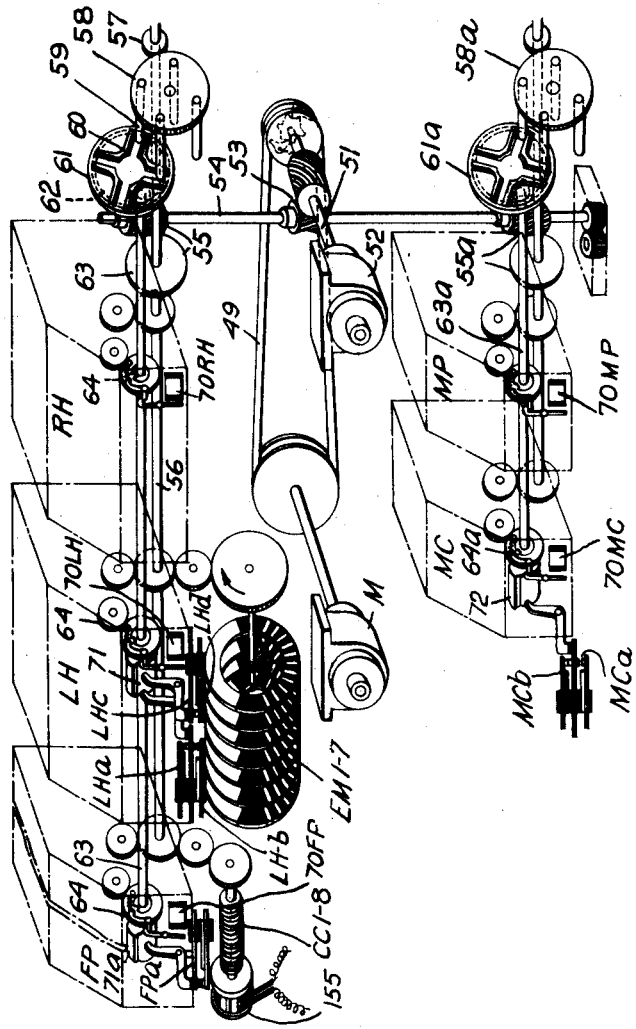

Referring first to Figures 1 and 1a the machine is driven by a motor M, which, through a belt drive 49 drives a shaft 51 which in turn drives an A. C., D. C. generator 52. This generator supplies both A. C. current and D. C. current to the various circuits of the machine. The shaft 51, through worm gearing 53, drives a vertical shaft 54 which, through worm gearing 55, drives a shaft 56. The shaft 56 drives three accumulators, FP, LH and RH. The shaft 56 also drives a group of seven emitters, EMI to EM7, a group of cams CC1 to CC8, and an impulse distributor 155. The emitters are constituted by electric commutators, and provide timed impulses for operating various circuits. The cams operate pairs of contacts which are also designated CC1 to CC8, and operate constantly so long as the machine is in operation.

The shaft 56 carries a gear wheel 57 which meshes with a gear wheel 58. This gear wheel through Geneva gearing 59, 60, drives a gear wheel 61 having internal teeth. A gear wheel 62 meshes with the gear wheel 61 and is secured on a reset shaft 63. Each of the accumulators FP, LH and RH can be coupled to the reset shaft on the engagement of a separate and associated one-revolution clutch, 64, which is engaged on the energization of an electromagnet 70 FP, 70 LH or 70 RH, respectively. When one of the clutches is engaged, the corresponding accumulator is reset to zero in the known manner.

A cam 71 is secured to the driven member of the clutch 64 of the accumulator LH, so that this cam turns through one revolution whenever the accumulator LH is being set. This cam opens a pair of contacts LH—a and closes two pairs of contacts LH—b and LH—c, and also a pair of contacts LH—d (not shown).

The driven member of the clutch 64 for the accumulator FP carries a similar cam 71a which rotates when the accumulator is reset and closes a pair of contacts FP—a.

In the lower part of the machine are two accumulators constituting a multiplier register MP and a multiplicand register MC. These accumulators are driven from the shaft 54 in a manner similar to the upper accumulators, and the driving connections are given similar references but with the suffix "a". These two registers may be reset on the energization of reset magnets 70 MP and 70 MC. The driven member of the clutch 64a for the register MC carries a cam 72 which rotates when the register is reset and opens a pair of contacts MC—b and closes a pair of contacts MC—a.

A number of multiplying relays are provided in a unit MPR and a number of column-shift relays are provided in a unit CS. All these relays are structurally similar to the multiplying relays described in the above mentioned patent, and include a controlling magnet which when energized at the beginning of a cycle of the machine, renders the relay operative. Each operative relay is mechanically restored to its normal condition at the end of the cycle in which it became operative. The mechanical movement of the relays are actuated by two cams 65 and 65b secured on the shaft 56a.

*Card-feeding mechanism*

The shaft 56 carries a gear wheel 68 (Figure 1a) which, through gearing 69, drives a gear wheel 73 which is freely mounted on a shaft 75. The gear wheel 73, through gearing 79, drives two gear wheels 81 which are secured to two pairs of feed rolls 82. These feed rolls thus operate continuously. The gear wheel 73 also drives a gear wheel 83 which is secured to feed-rolls 85, and the latter also operate continuously. One element 76 of a one-revolution clutch is secured to the gear wheel 73, and the other element 77 of this clutch, which element is constituted by a pawl, is pivoted on an arm 78 secured to the shaft 75. This clutch is of a conventional one-revolution kind, and is engaged when a magnet 166 is energized and becomes disengaged on the completion of a revolution if the magnet 166 is de-energized at that time. The gearing 69 is such that one revolution of the shaft 75 occurs while the shaft 56 is completing two revolutions. The shaft 75 carries a gear wheel 74a which drives a gear wheel 74b. This gear wheel is secured to a gear wheel 74c which drives a gear wheel 74d, secured to a conducting feed-roll 87. The roll 87 thus revolves only so long as the card-feed clutch is engaged and co-operates with a plurality of card-reading brushes 109 (Figure 2). The gearing 74a to 74d is such that the roll 87 rotates at a slightly different speed to the shaft 75 in order that contact between it and the brushes 109, through corresponding holes in the card, shall not always take place at the same spots on the roll. This reduces the liability for the roll to become pitted. Feed rolls 94 and 95 co-operate with the roll 87 and are secured respectively to gear-wheels 89 and 96 (Figure 1a), which mesh with the gear wheel 86 secured on the shaft 75. The gear wheel 96 also drives a series of cams FC.1 to FC.30 through gearing 91. These cams operate similarly designated contacts during card-feed cycles only.

The shaft 75 carries a cam 97 which operates a follower 98 to rock a shaft 102. This shaft carries an arcuate rack 103 which meshes with teeth formed on a card-picker 104 (see Figure 2). The card-picker makes one reciprocation for each card-feeding cycle of the machine.

The operation of the card-feeding mechanism is as follows. The card-picker moves forward towards the end of the first half of a card-feeding cycle, and feeds the lowermost card of the pile 105 to the constantly-rotating feed-rolls 82. These rolls advance the card between the contact roll 87 and the feed-roll 94. At the end of the first card-feeding cycle the card is clear of the rolls 82 and its leading edge is located between the brush 109 and the contact-roll 87. In this position the card closes the card-lever contact 112.

On the next card-feeding cycle, the card is fed past the brushes 109 and the amounts contained in the card are read out and entered into the machine. This reading operation occurs during the first half of a card-feeding cycle. Finally the card is fed by the rolls 85 into a card-receiving tray of a punching mechanism. This position of the card is indicated at R in Figure 1a and in this position the card closes card-lever contacts 120. It should be noted that while one card is being fed past brushes 109 and delivered to the punching mechanism, another card is being fed from the stack 105 into position to close the contacts 112, and with its leading edge beneath the brushes 109.

The punching mechanism

The punching mechanism is identical with that described in the patent specification referred to above, and is of the kind described in the Lee and Phillips United States Patent No. 1,772,186. It will therefore be unnecessary to describe this mechanism in detail, and it will be sufficient to state that, after each card has been fed to the position R (Figure 1a) it is fed to the left by a feed-rack 110 which delivers it to a second feed-rack not shown. The second feed-rack feeds the card further to the left until the first column of a field in which a product is being punched is beneath a row of punches, not shown. There are twelve punches, one for each hole-position in the column of the card, and one for each digit in a duo-decimal notation. Any one punch can be selected to perforate the card by energizing an associated punch-selecting magnet 113 (Figure 3g). When one of these magnets is energized it closes contacts 114 (Figure 3h) to energize a punch-operating magnet 115 which forces the selected punch through a card in the known manner. Concurrently, the second feed-rack escapes one step and brings the next column beneath the punching mechanism. On conclusion of a punching operation the second feed-rack escapes continuously and brings the card into register with an ejecting mechanism. This mechanism is brought into action on the energization of ejector magnet 116 and operates to eject the card in a known manner. As soon as the card has been delivered by the first card-rack to the second card-rack, the former returns to its starting position in readiness to receive the next card from the card-feeding mechanism. When the card has been removed from the second card-rack, a punch clutch-magnet 117 is energised and engages a clutch (not shown) to couple both the card-feed racks to a motor M2 and also closes contacts 118 to energise the motor M2. This motor then moves the first card-rack with the new card in it from right to left, and the second card-rack from left to right, so that the card is transferred from the former to the latter. It should be noted that when a card has been positioned under the punches in readiness for punching, it remains in that position until a multiplying operation has been completed.

The various circuits involved in the above operation of punching and ejecting the card, will be referred to again later.

General operation

Before explaining the circuits of the machine in detail, a general explanation will be given of the manner in which the machine multiplies a sterling amount by a decimal amount. It will be assumed that a card is passing through the machine which carries the two factors £12.17.5 and 603. The calculations performed by the machine to obtain the product of these two factors are shown in Table I below:—

TABLE I

| | | |
|---|---|---|
| From card to multiplier register | | 603 |
| From card to multiplicand register | | 12.0000 |
| From card to translator | 17/5 | |
| From translator to multiplicand register | | 0.8625 |
| | | £12.8625 |
| From translator to pence relays | | 2d. |

| Multiplier | Multiplicand | LH partial product | RH partial product |
|---|---|---|---|
| 3 × | 12.8625 | 2.1010 | 86.4865 |
| 600 × | 12.8625 | 1431.3000 | 6286.2000 |
| | | 1433.4010 | 6322.6865 |
| | | 6322.6865 | |
| Add RH product to LH product | | £7756.0875 | |

| Multiplier digit | | Pence product |
|---|---|---|
| 1d.×3 | = | 3 |
| 1d.×600 | = | 2 10 0 |
| | | 2 10 3 |
| Add pence product to itself | | 2 10 3 |
| | | 5 0 6 |
| Translate and add decimal product | | 7756 1 9 |
| | | £7761 2 3 |

Referring to this table, as the card passes the brushes 109, the multiplier 603 is read from the card and entered into the multiplier register MP. Concurrently the pounds portion of the multiplicand, namely, £12 is read and entered into the 5th and 6th denomination of the multiplicand register. The shillings and pence portion of the multiplicand, in this case 17/5, is entered into translating mechanism which is constituted by a number of relays described hereinafter. The translating mechanism determines that the amount 17/5 can be expressed as the sum of 17/3+2d. and it registers the remainder 2d. in suitable relays. All these operations have occurred during the first half of a card-reading cycle. During the second half of this cycle, the translating mechanism enters into the four lower denominations of the multiplicand register, the amount of 0.8625, which is the decimal equivalent in terms of pounds, with one pound as unity, of 17/5. These operations are shown in the upper part of the table.

The machine then proceeds to multiply the decimal pounds amount by 3, to obtain two partial products, one of which is entered into the accumulator LH, and the other into the accumulator RH. The next operation is to multiply the decimal pounds amount by 600, and enter the two partial products into the two accumulators LH and RH. This completes the actual multiplying operation, and the machine next transfers the amount in the accumulator RH to the accumulator LH, to obtain a product of £7756.0875. These operations are shown in the center part of the table.

Concurrently with the above multiplying operation, the machine first determines the product 1d.×3, and then the product of 1d.×600, expressing the product, in each case, in the sterling notation. These two products are entered consecutively into the accumulator FP, so that this accumulator will eventually contain £2.10.3 the product of 1d. and 603. The amount required, is, however, the product of 2d. and the multiplier; and accordingly, the amount in the accumulator FP is read out and reentered into the accumulator so as to be added to itself, giving a remainder partial-product of £5.0.6. If the remainder had been 1d., instead of 2d., the doubling operation would have been omitted, while if there had been no remainder, no pence multiplication would have taken place.

The machine now contains £7756.0875 in the accumulator LH and £5.0.6 in the pence product accumulator. The former amount is read out and entered into the accumulator FP, being converted into the sterling notation during this operation, so that £7756.1.9 is entered into the accumulator FP, to get the final product of £7761.2–3. The final operation is to punch this product and this is effected by the punching mechanism under the control of the accumulator FP.

*The circuit diagram*

Before describing the operation of the machine with reference to the circuit diagram it should be explained that the three accumulators and two registers of the machine are conventional accumulators of the Hollerith type. The two registers comprise eight denominations each, and the accumulators RH fifteen denominations, and the accumulators LH and FP sixteen denominations each. The registers MC and MP and the accumulators LH and RH are arranged to register decimal amounts but the accumulator FP is a sterling accumulator arranged to register pounds, shillings, and pence. An accumulator-magnet is provided for each denomination, these accumulator-magnets being designated 121 with a suffix identifying them with the respective register or accumulator. For example, the accumulator-magnets for the register MP are shown at 121MP, Figure 3a. Each magnet when energized couples an accumulator-wheel to a constantly rotating shaft, so that the accumulator-wheel turns to an extent determined by the time in the machine cycle when the magnet was energized, which time is in turn determined by the digit to be entered.

Each register and accumulator is provided with reading-out mechanism of a known commutator type. The reading-out mechanism MPRO (Figure 3a) for the register MP will be explained briefly as being typical of them all. This mechanism includes a brush 122a for each denomination, each brush being driven by the associated accumulator-wheel. Each brush co-operates with a set of ten segments 123a and a common sector 124a, and is positioned by its accumulator-wheel to connect one of the segments 123a to the segment 124a. Each segment 123a is allocated to a different digit, and the brush 122a engages the segment allocated to the digit registered by the corresponding accumulator-wheel. It will be seen from Figure 3a that certain of the sets of the segments 123a are common to two denominations. Each accumulator-wheel also drives a brush 122b which cooperates with a single zero segment 123b and a common segment 124b. The parts identified by the suffix b form a separate reading-out mechanism for determining which of the denominations of the register contain zero, and controlling the cycles of the machine accordingly. The brushes 122a and 122b are shown in the position assumed when the amount 603 is registered in the register MP.

Figure 3D:
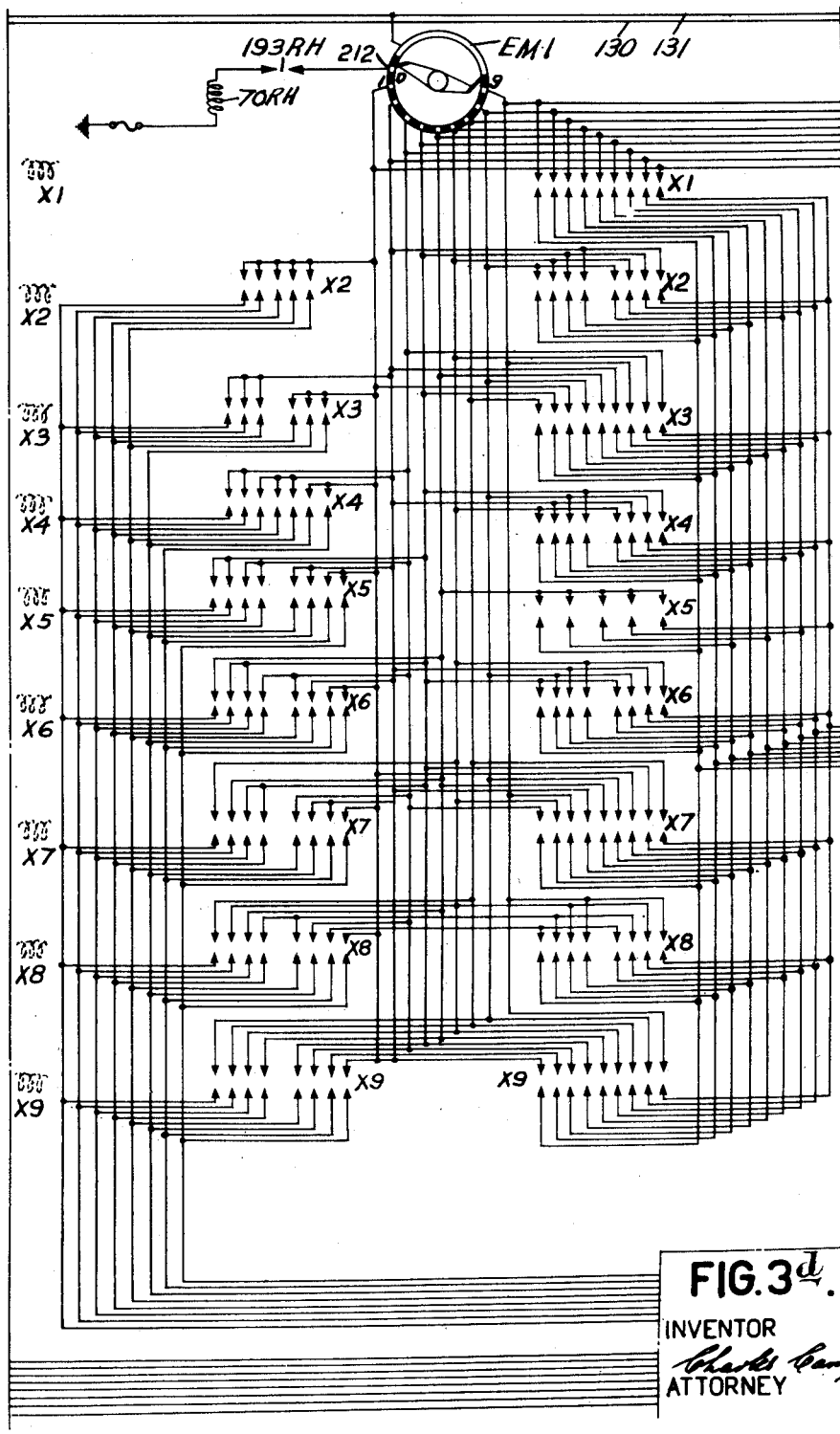
Figure 3E:
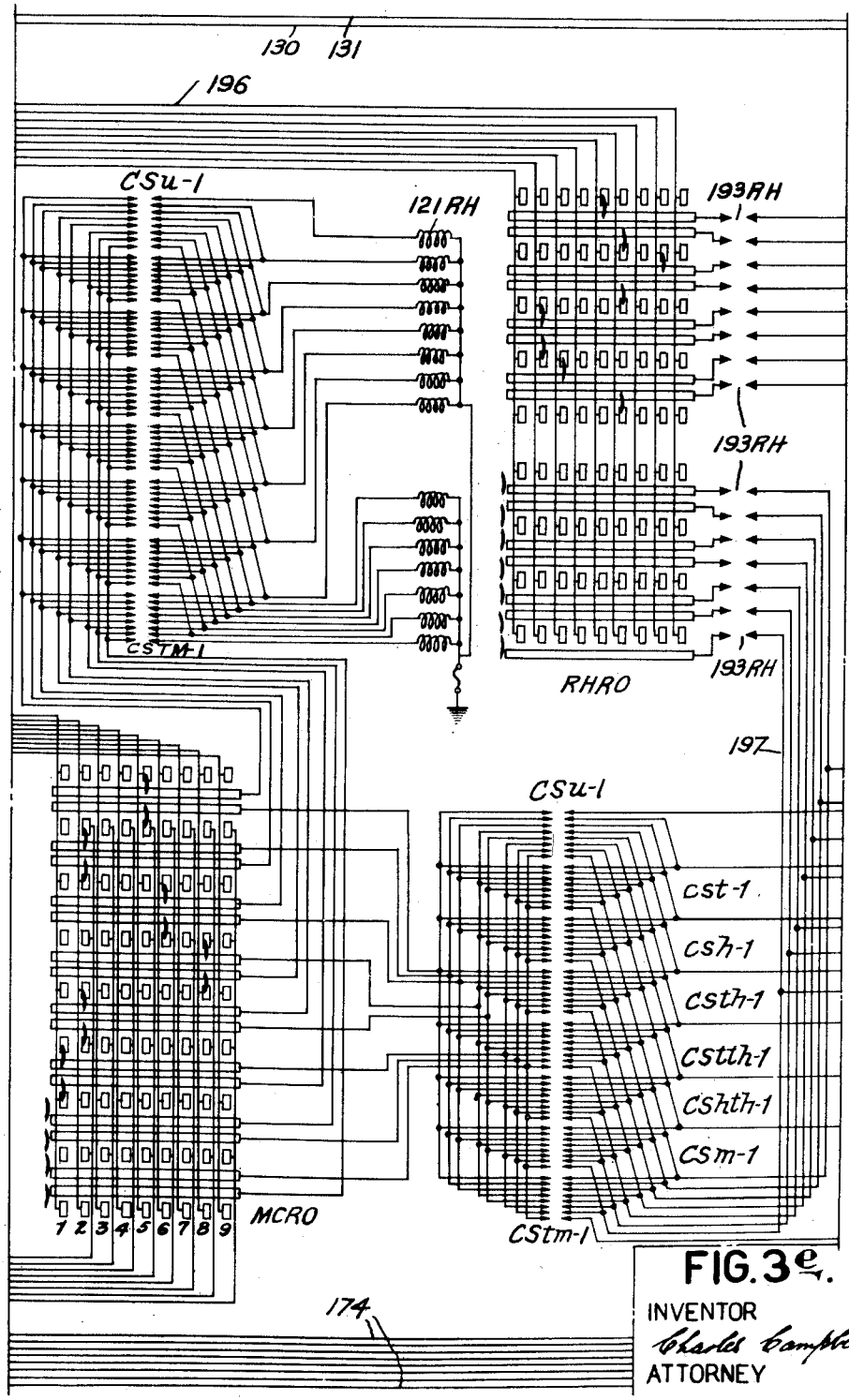

The reading-out mechanism MCRO for the register MC is shown in Figure 3e, and comprises two sets of reading-out commutators, similar to the commutators identified by the suffix a in the multiplier reading-out mechanism MPRO. This arrangement allows of two distinct series of circuits being completed through this reading-out mechanism, for the transmission of the two partial products of the decimal multiplication. The reading-out mechanism RHRO for the accumulator RH is shown in the same figure, and comprises but a single set of commutators. The accumulator LH has a reading-out mechanism LHRO1 (Figure 3f) for reading out the amount contained in that accumulator into the accumulator FP, and a second reading-out mechanism LHRO2 (Figure 3g) which allows of the product being recorded from this accumulator when purely decimal multiplication is effected. The accumulator FP has reading-out mechanism FPRO which includes two sets of commutators, one to control the doubling operation, and the other to control the punching of the product. The manner in which these various reading-out mechanisms are wired up will be clear from the subsequent explanation of the circuit diagram.

In addition to the relays contained in the units MPR and CS, the machine is provided with a number of multi-contact electrical relays, which are identified in the circuit diagram by the reference RX and a suffix or RCS and a suffix, RC, DC, D, and DT, and which control the multiplication of the remainder. One of these relays is shown diagrammatically in Figure 5. Each relay comprises an operating magnet RX or RCS which, when energized, attracts its armature 125. This armature is then latched in its attracted position by a spring-pressed latch 126. When the armature is attracted it moves a contact-operating member 127 to the right so as to close a number of pairs of contacts 128. To restore the relay to its normal condition, a resetting magnet RXa or RCSa is energized, and attracts the latch 126 so as to release the armature 125. A spring 129 then moves the contact-operating member 127 and the armature 125 back to their normal positions. In the circuit diagram the operating magnet of each of these relays has the same reference as the relay, the resetting magnet has this reference and the suffix "a" and the contacts of the relay have this same reference with, in some cases, a numerical suffix. The various relays RX and RCS are distinguished from one another by suffixes.

Card-feed and control circuits

With the motor M in operation, the generator 52 will supply direct current to lines 130 and 131 (Figure 3h), while the A. C. generator will supply alternating current to a wire 132 (Figure 3a) and to earth.

The machine is started by depressing a start key, 133 (Figure 3h) completing a circuit from the line 130, through a relay coil C, the contacts 133, normally closed contacts G1 and cam contacts FC—2. The coil C closes its contacts C1 to complete a holding circuit through these contacts and cam contacts FC—8. This coil also closes contacts C2 to provide a circuit from the line 130 through normally closed contacts F—1, the card-feed clutch-magnet 766, cam contacts FC—8, stop contacts 134, normally closed relay contacts N1, the contacts C2 and contacts P1, which are closed by the card-rack 110 (Figure 1a) when this rack is in position to receive a card from the card-feeding mechanism. The contacts P—1 ensure that the card will not be fed unless the punch is ready to receive it. After the card-feeding mechanism has started in operation, the cam contacts FC—8 open to de-energize the magnet C which in turn de-energizes the clutch magnet 766. The mechanism will therefore come to rest after one card-feeding cycle, and with the first card with its leading edge just beneath the brushes 109.

A fresh card-feed cycle is then initiated by again closing the contacts 133. During the first card-feeding cycle the card has closed the contacts 112, which energize relay coils H and Q. The relay Q closes contacts Q—1 (Figure 3a) to prepare the card-reading circuit. Early in the second card-feeding cycle, cam contacts FC—11 (Fig. 3h) close to complete a circuit through contacts 112 and a relay coil G. The coil G opens its contacts G1 to interrupt the starting circuit through the contacts 133, and closes its contacts G—2 and G—3 to provide a holding circuit extending through the contacts G—2 and cam contacts FC—2. This circuit is interrupted towards the end of each card-feed cycle by the opening of the contacts FC—2, but the coil G is maintained energized over a circuit extending through the contacts G—2, G—3 and 112 at the time when the contact FC—2 opens, provided that a card has been fed from the magazine and has closed the contacts 112. Thus so long as cards feed, either the contacts 112 or the contacts FC—2 will be closed and the coil G will remain permanently energized. These holding circuits also serve to maintain the coils H and Q energized. The machine is now ready to read the factors from a card and to decimalize the multiplicand.

Entering circuits

A typical circuit for entering the multiplier extends from the line 131 (Figure 3a) through the relay contacts Q—1 which are now closed, cam contacts FC—7 which close during the reading portion of the cycle, the impulse distributor 155 which prevents sparking at the brushes, the conducting roll 87, one of the brushes 109MP and the connected magnet 121MP, to a line 130. These circuits are so timed by the holes in the card that the multiplier is entered into the multiplier register.

The present machine is capable of dealing with multiplicands containing four denominations of pounds, two of shillings, and one of pence. Brushes 109MC which read the pounds amount from the card, are connected to the four higher accumulator magnets 121MC (Fig. 3b) of the multiplicand register by plug connections inserted between sockets 134 and sockets 135. The circuits for entering the pounds portion of the multiplicand are similar to those by which the multiplier is entered.

The brush 109MC which reads the pence amount on the card is plug-connected to a socket 136 (Fig. 3a) while the brushes reading the shillings amount are plug-connected to sockets 137 and 138. As explained previously, the shillings and pence portion of the multiplicand is divided into an amount which is a whole multiple of three pence and a remainder of nothing, one penny or two pence. The manner in which the remainder is determined and registered will now be explained.

Cam contacts FC—18 close momentarily while each of the hole positions, in the pence column of the card, representing the digits 11, 8, 5 and 2 are passing the pence brush 109MC. Thus if the pence digit is 11, 8, 5 or 2, a circuit will be completed from the line 131, through the contact roll 87, the pence brush, the cam contacts FC18, a relay coil 2R and a line 139, to the line 130. For thense pence values, the remainder is 2d. and this remainder is registered in the machine by the energization of the relay 2R. In the same way, cam contacts FC—19 close momentarily while each of the hole positions 10, 7, 4, 1 are passing the pence brush, and a relay 1R will be energized to register the remainder 1d. If a hole had been punched in one of the 9, 6, 3 and 0 positions, neither of these two relays would have been energized, and the machine would operate on the assumption that there was no remainder. It may be mentioned that 10 pence is indicated on the card by a perforation in the well known "11" or "X" index point position and 11 pence by a perforation in the "12" or "R" index point position. The uppermost line in Fig. 4 indicates the relationship between the time of sensing the values on the card and the points of the machine time.

Each of the relays 2R and 1R closes, when energized, associated holding contacts 2R—1 or 1R—1, to provide a holding circuit extending from the line 131 through the contacts Q—1, cam contacts FC—29, a line 140, the contacts 2R—1 or 1R—1 as the case may be, and the associated relay coil, to the line 130. This holding circuit, is maintained until the card has been completely read, then cam contacts CC—6 close to complete a circuit from the AC line 132 through the closed contacts 2R—2 or 1R—2 and remainder control relay magnets RC. If the relay 2R is energized, a circuit is also completed through the contacts CC—6, contacts 2R—3 of the relay 2R and a doubling control relay magnet DC. The relays DC and RC are of the type shown in Figure 5, and the magnets just referred to are equivalent to the operating magnets RX shown in that figure. These relays remain operative during the whole of the calculating cycles of the machine, and are restored to their normal condition in a manner which will be explained later.

The remaining portion of the shillings and pence part of the multiplicand is read, translated into decimals of £1, and the decimal amount is entered into the four lower denominations of the multiplicand register. The manner in which the translation is effected will be clearer with the assistance of the following table which shows the decimal values for various shillings values plus 0d., plus 3d., plus 6d., and plus 9d.

TABLE II

*Decimals of £1*

| Shillings | Shillings +0d. | Shillings +3d. | Shillings +6d. | Shillings +9d. |
|---|---|---|---|---|
| 00 | .0000 | .0125 | .0250 | .0375 |
| 01 | .0500 | .0625 | .0750 | .0875 |
| 02 | .1000 | .1125 | .1250 | .1375 |
| 03 | .1500 | .1625 | .1750 | .1875 |
| 04 | .2000 | .2125 | .2250 | .2375 |
| 05 | .2500 | .2625 | .2750 | .2875 |
| 06 | .3000 | .3125 | .3250 | .3375 |
| 07 | .3500 | .3625 | .3750 | .3875 |
| 08 | .4000 | .4125 | .4250 | .4375 |
| 09 | .4500 | .4625 | .4750 | .4875 |
| 10 | .5000 | .5125 | .5250 | .5375 |
| 11 | .5500 | .5625 | .5750 | .5875 |
| 12 | .6000 | .6125 | .6250 | .6375 |
| 13 | .6500 | .6625 | .6750 | .6875 |
| 14 | .7000 | .7125 | .7250 | .7375 |
| 15 | .7500 | .7625 | .7750 | .7875 |
| 16 | .8000 | .8125 | .8250 | .8375 |
| 17 | .8500 | .8625 | .8750 | .8875 |
| 18 | .9000 | .9125 | .9250 | .9375 |
| 19 | .9500 | .9625 | .9750 | .9875 |

From the above table, it will be seen that the value in the last two decimal places is either 00, 25, 50 or 75, depending solely on whether the pence value were nothing, 3d., 6d., or 9d. respectively. Referring to Figure 3a, four relays 0D, 3D, 6D and 9D are provided, and correspond respectively to remainders of 0d., 3d., 6d., and 9d. The relay 0D must be energized when the pence digit is 0d., 1d., or 2d. and this relay is therefore connected to the lower brushes through cam contacts FC—16 which are timed to close while the hole positions 0, 1 and 2 are passing the pence brush 109MC so that the relay 0D will be energized when there is a hole in one of these positions. The relays 3D and 6D are connected in a similar manner to the pence brush through cam contacts FC—15 and FC—14 respectively; these contacts close respectively while the hole positions 3, 4 and 5 and the hole positions 6, 7 and 8 are passing the pence brush. The relay 9D is connected to the pence brush through cam contacts FC—13 which close while the 9 hole is passing the pence brush, and cam contacts FC—17 which close while the 10 and 11 holes are passing the pence brush. The timing of these cams is shown in Figure 4, together with the time at which the various holes pass the brushes, the latter being shown in the top line on the left of this figure. When energized each of these relays closes contacts 0D—1, 3D—1, 6D—1 or 9D—1, to provide a holding circuit for itself through cam contacts FC—28 which maintain the relay energized until late in the second machine cycle of the two such cycles comprised within a card-feeding cycle.

In Figure 3b the dotted line 144 indicates the division between the decimal and the pounds part of the multiplicand register, the magnets above this line being those which control the entry of the decimal amount. The plug-socket 135 connected to the lowest denominational magnet 121MC is connected to a plug socket 140 which in turn is connected to a common segment 142 of the emitter EM4 (Fig. 3a). The emitters are all similar, and a brief description of this one will apply to all of them. The emitter EM4 includes a pair of connected brushes 141 which rotate synchronously with the cycle of the machine, to connect each of a number of conducting segments 143 in turn to the common segment 142. Each of the segments 143 is associated with a separate digit and is connected in circuit at a time in the cycle appropriate to that digit. The "five" segment of this emitter is connected to a line 145, and the circuit through this emitter serves to energize the magnet 121MC for the lowest denomination at the "five" time in the cycle to enter 5, when the pence digit is either 3d., 4d. or 5d., or is 9d., 10d. or 11d. From the line 145 the entering circuit normally extends through relay contacts 6D—2, a line 146, relay contacts 9D—2, a line 147, cam contacts FC—30 which close during the entering portion of the second machine cycle comprised within a card-feeding cycle, a line 148 and the relay contacts Q—1. It will be seen that this circuit will not be broken if either of the relays 3D and 0D is energized, but will be interrupted if either of the relays 6D and 9D is energized. In the latter case there will be no entry into the lowest denomination of the multiplicand register; in the former case 5 will be entered into the register. From Table II it will be seen that the entries should be made in this manner.

The second lowest accumulator-magnet 121MC is plug-connected to the emitter EM5, the "two", "five", and "seven" digital conducting segments of which are connected respectively to lines 149, 150 and 151. This allows of the entry of either 2, 5 or 7 into this denomination of the register.

When ninepence is to be decimalized, the relay 9D is energized, closes its contacts 9D—2 completing a circuit through the contacts Q—1, the line 148, the contacts FC—30, the line 147, the contacts 9D—2, the contacts 6D—2, the line 145, a line 152, the contacts 3D—2, a line 153, the contacts 9D—2 which have now been closed, the line 151, the emitter EM5 at the "seven" time in the cycle, and the accumulator-magnet 121MC for the lowest denomination but one. It will be noted that this circuit will be interrupted by the concurrent energization of one of the other three relays. This is a safety measure.

When the relay 6D is energized, the circuit extends as before, through the contacts 9D—2, the line 146, and then through the now closed contacts 6D—3, the line 150, the emitter EM5 at the "five" time in the cycle, and the accumulator-magnet 121MC. In this manner 5 is entered when sixpence is decimalized.

When the relay 3D is energized, the circuit extends through the contacts 9D—2, the contacts 6D—2, the line 145, the line 152 and the now-closed contacts 3D—3, the line 149, the emitter EM5, at the "two" time in the cycle, and the accumulator-magnet in question. 2 is thus entered when threepence is decimalized. When there is no pence digit to be decimalized, the relay 0D is energized, and opens its contact 0D—2, thereby interrupting all the circuits through the emitter EM5 so that no entry is made into the lowest but one denomination of the multiplicand register.

It will be seen from Table II that the digit in the second decimal place depends both on the pence value and on whether the shillings value is even or odd. Thus, with 0d. the value to be entered is 0 if the shillings value is even, and 5 if the shillings value is odd. In the same way, with 3d., 1 must be entered if the shillings value is even and 6 if the shillings value is odd. In the same way, with 6d., 2 and 7 must be entered, and with 9d. 3 or 8 must be entered.

The units of shillings brush 109MC is connected by the plug socket 137, to two pairs of contacts FC—20 and FC—21. The former contacts close momentarily while each of the odd-number hole positions is passing the brushes, while the latter contacts close momentarily while each of the even-number hole positions is passing the brushes. Thus, an entering circuit will be completed through the contacts FC—20 and relays 0S if the unit of the shillings digit is odd and through the contacts FC—21 and relays ES if the unit of the shillings digit is even. The relay 0S or ES, as the case may be, closes holding contacts 0S—1 or ES—1 to complete a holding circuit through the cam contacts FC—28. As may be seen from Table II there are seven possible entries that can be made into the third denomination of the multiplicand register. The relays 0D to 9D, 0S and ES between them determine which of these entries shall be made. When energized the relay 0D closes its contacts 0D—3 to complete a circuit through the cam contacts FC—30 and a line 156. If the relay ES has been energized, but not the relay 0S, this circuit will be interrupted by the open contacts 0S—2. If, however, the units of the shillings digit is odd, the relay 0S will be energized, and the contacts 0S—2 closed, so that the circuit will continue through a line 157, the emitter EM6 at the "five" time in the cycle, and the third lowest accumulator-magnet 121MC. In this manner nothing will be entered with even shillings and no pence, while 5 will be entered with odd shillings and no pence.

When the relay 3D is energized, the entering circuit will extend from the cam contacts FC—30 through the contacts 0D—2, and 6D—2, the line 152, the contacts 3D—3, a line 158 and then through contacts ES—2 closed if the relay ES is energized, a line 159, the emitter EM6 at the "one" time in the cycle, and the third multiplicand accumulator-magnet 121MC. If the relay 0S had been energized, the circuit would have continued from the line 158 through the contacts 0S—3, a line 160 and the emitter EM6 at the "six" time in the cycle. Thus, 1 or 6 is entered depending upon whether the units of shillings were even or odd respectively.

With the relay 6D energized, the circuit extends through the contacts 6D—2 and 6D—3, the line 161 and either the contacts ES—4 and the emitter EM6 at the "two" time in the cycle, or through the contacts 0S—5 and the emitter EM6 at the "seven" time in the cycle. Finally, with the relay 9D energized, the circuit extends through the contacts 0D—2, 6D—2, 3D—2 and 9D—2, the line 151, a line 162 and either the contacts ES—3 or 0S—4. In the former case the circuit is established at the "three" time in the cycle and in the latter case at the "eight" time in the cycle.

Turning again to Table II, it will be noticed that nothing should be entered into the tenths denomination of the multiplicand register MC, when the units of shillings value is 0 or 1, assuming the tens of shillings be zero but that 5 must be entered when the units of shillings is 0 or 1 and the tens of shillings is 1. In the same way there are two values to be entered for each pair of units of shillings digits, according to the value of the tens of shillings digit. Thus, 3 must be entered when the units of shillings is 6 or 7 and the tens of shillings zero, but 8 must be entered if the units of shillings digit is 6 or 7 and there is ten shillings.

The machine is provided with five relays 0—1S, 2—3S, 4—5S, 6—7S, 8—9S. Each of these relays is allocated to the two units of shillings digits which are prefixed to the character S. Each relay is connected to the units of shillings brush 109MC through a pair of contacts FC—22, —23, —24, —25 or —26 respectively, which close while the two corresponding hole positions are passing the units of shillings brush. Thus the relay appropriate to the unit of shillings digit will be energized, and will hold itself energized through its No. 1 contacts, and the cam contacts FC—28.

The tens of shillings brush is included in a circuit which comprises cam-contacts FC—27 (which close while the "one" hole is passing the tens of shillings brush) and relays 10S. Thus, these relays will be energized if there is 10s. in the amount but not if the tens of shillings digit is zero. In the example discussed previously, the shillings amount was 17s., and accordingly the relays 10S and 6—7S will be energized, and will maintain themselves energized until towards the end of the card-reading cycle.

From Table II it will be seen that 8 should be entered into the "tenths of pounds" denomination in the multiplicand register when the shillings amount is 17. The relay 6—7S closes contacts 6—7S—2, while the relay 10S opens its normally closed contacts 10S—2 and closes its normally open contacts 10S—3. When the brush of the emitter EM7 engages the "eight" digital segment, a circuit is completed through the cam contacts FC—30, a line 163, the contacts 6—7S—2, the contacts 10S—3, a line 164, the emitter EM7, and the fourth accumulator-magnet 121MC of the multiplicand register. If the shillings had been 7s., the relay contacts 10S—2 would have been closed, and the relay contacts 10S—3 open, since the relay 10S would not be energized. The circuit would then have extended through the contacts 6—7S—2 and 10S—2, a line 165, and the "three" digital segment of the emitter EM7, so that 3 would have been entered in the multiplicand register. The circuit for entering the decimal equivalent of other shillings amounts can readily be traced. It should be noted that while the 9 hole is sensed before the 10 hole, the circuits are not effective until a later cycle and after the 10 hole has been sensed to control the contacts 10S—2, 10S—3 and preset the same before entering operations take place under control of the emitters. Thus FC30 which supplies current to these contacts is not closed until the second half of the card feed cycle and after the card has been completely sensed.

At this stage the card has been completely read, and the multiplier has been registered in the register MP and the multiplicand has been decimalized and registered in the register MC, while the remainder has been registered in the relays DC and RC. The machine is now ready to commence its multiplication, but, before doing so, the accumulators LH and MP are reset in the following manner.

At the end of the last run of cards, the machine is stopped with the second card-feed rack in the last column position in which a card carried by it is in position for ejection. In this position the rack closes the contacts P—2 (Figure 3h). These contacts complete a circuit through a relay K which opens the contacts K—1 and closes the contacts K—2. This relay also closes contacts K—3 (Figure 3a). At the end of the card-feeding cycle, the first card is passed into the punching mechanism and closes cardlever contacts 120 (Figures 2 and 3h) so as to energize a relay F. The coil F closes contacts F—3 (Figure 3a) and at the end of the cardfeeding cycle a circuit is completed from the AC line 132, through cam-contacts CC—2, the relay contacts K—3, relay contacts L—2 which are normally closed, the relay contacts F—3, and the reset magnets 70LH and 70FP. These magnets clutch the accumulators LH and FP to the reset shaft 63 (Figure 1) so that the accumulators are reset in the following machine cycle.

The relay coil F also opens its contacts F—1 to prevent re-energization of the card-feed clutch magnet 706 and closes its contacts F—2. Closure of the latter completes a circuit from the line 130 through the contacts F—2, contacts CC—3, the punch clutch-magnet 117, punch contacts P—3 and the contacts k—2 to the line 131. The energization of the magnet 117 results in the card being fed through the punching mechanism as previously explained, and this card in turn results in the contacts P—2 and 120 opening to de-energize the relays K and F. The card feed continues until the card is in position for the commencement of the punching of the product in it. The machine is now ready for multiplication.

*Multiplication*

Towards the end of the resetting of the accumulators LH and FP, contacts LH—b, FP—a and LH—c close to energize a relay coil L which closes its contacts L—1 to provide a holding circuit for itself over a line 166, and punch contacts P6 which are closed by the second card rack when the card is in position for ejection. The coil L also opens its contacts L—2 (Figure 3a) to prevent re-energization of the reset magnets for the accumulators LH and MP.

The contacts LH—d also close at this time, so that a circuit is completed from the line 131 through the contacts LH—b, FP—a, LH—c and LH—d in series, a line 167 which is connected to relay coils M, N and R (Figure 3a) and through these relays to the line 130. The relay M closes its contact M—1 to provide a holding circuit, for itself and the relays N and R, which extends from the line 130 through the relays, the contacts M—1, a line 168, (which extends over to Figure 3h), normally closed contacts MC—b, and a line 169 to the line 131. This circuit persists and the relays remain energized until the multiplicand register is reset and the contacts MC—b open. The relay N opens its contacts N—1 (Figure 3h) so as to prevent the re-energization of the card-feed clutch magnet 166 during multiplying operations. The relay M also closes its contact M—2 (Figure 3a) to prepare the circuit of the cycle-controlling mechanism.

Closure of the contacts M—1 also completes a connection from the line 131 through the contacts MC—b, (Fig. 3h) wire 168 to Fig. 3a the contacts M—1 and a line 170, to all the zero segments 123—b of the multiplier reading-out mechanism MPRO (Figure 3a). Connected to the common segments 124b of this mechanism are a number of relays Yu, Yt etc. to Ymt. Each of these relays is appropriated to a denomination of the multiplier and is energized when there is zero in that denomination. For instance, with 603 registered, the relay Yt will be energized, the circuit extending from the tens denominational segment 123b, through the brush 122b and segment 124b of that denomination, and the relay coil Yt. With 603 registered the relays Yth to Ytm would also be energized only the relays Yu and Yh being de-energized. Each energized coil Y closes corresponding holding contacts designated Yu—1, Yt—1 etc. to maintain itself energized. Each energized relay Y also opens associated contacts Y—2, and closes associated contacts Y—3. For instance, the relay Yt when energized will open contacts Yt—2 and close contacts Yt—3. Thus, with 603 registered, the contacts Yu—2, Yu—3, Yh—2 and Yh—3 will be in the position shown, while the remaining contacts Y—2 and Y—3 will be shifted from the position shown.

Towards the end of the cycle following the card-feeding cycle, cam contacts CC—2 close to establish a circuit extending from the AC line 132, through the contacts CC—2, M—2, and Yu—2, a relay CS—u, and in parallel through a relay RCS—u and contacts RC—1, the units common segment 124a, brush 122a, and No. 3 segment 123a, a line 171—3, and a coil X—3 to earth, and also in parallel through contacts RC—2 and a coil RX—3 to earth. The contacts RC—1 and RC—2 are closed by the relays RC, there being a remainder in the problem under consideration.

The machine is now ready to multiply by the first digit of the multiplier, in the example in question by three. The decimal multiplying circuits are of the type usually employed in machines of the present kind and are fully described in British patent specification No. 358,105. The circuit extends through the emitter EM—1 (Figure 3d), the closed contacts of the relay X—3, the reading-out mechanism MCRO (Figure 3e) of the register MC, the two sets of contacts CSu—1 and the two sets of counter-magnets 121RH and 121LH of the two accumulators. The emitter EM—1 emits product-representing digits which are arranged in accordance with the three-times multiplication table by the relay contacts X—3. The reading-out mechanism MCRO further selects and arranges the impulses in accordance with the digits it registers so that the impulses on leaving this mechanism are representative of the two partial products. The column shift relay contacts CSu—1 assign to the partial products their proper denominational value, having regard to the denomination of the multiplier by which the multiplication is being effected at that stage. The column shift relay which is energized at any stage corresponds to the denomination of the multiplier by which multiplication is being effected and shifts the entry into the two accumulators so that the partial products obtained are multiplied by the power of ten appropriate to the multiplier denomination in question. At the end of this cycle the accumulator RH will contain the right-hand partial product of three times the multiplicand and the accumulator LH the left-hand partial product of three and the multiplicand.

Concurrently one penny is multiplied by 3 and the product is entered into the final product register. The circuits for doing this are shown to the left-hand of Figure 3b and in Figure 3c.

It should be explained that there is a magnet RX for each digit, and each such magnet closes, when energized, correspondingly designated contacts. There is also a relay RCS for each denomination from the units denomination to the millions denomination. The contacts of these relays are connected in groups, as shown in the circuit diagram, to lines 174 (Fig. 3c), which extend over to Figure 3f and are connected to lines 175 which in turn are connected to the lowest eight counter-magnets 121FP through normally closed contacts DT—1 of a decimal to true relay DT. It will be appreciated that each line 174 is appropriated to a particular denomination of the final product accumulator which is a sterling accumulator having its lowest wheel arranged in accordance with the duo-decimal notation and its third lower wheel arranged to register 0 or 1 only.

The emitter EM2 (Fig. 3c) impresses timed impulses on a group of lines 173 in accordance with the decimal notation, and serves for entering all the decimal digits into the accumulator FP. The emitter EM3 (Fig. 3b) is a duo-decimal emitter, and differs from the other emitters in that it has twelve digital conducting spots, and makes successive contact with all of these spots in the same time as the other emitters make contact with their ten conducting spots. This allows of the entry of any digit in the duo-decimal notation during the normal decimal entering period. The emitter EM3 impresses impulses on a group of lines 172, of which there is one for each digit from 1 to 10. No connection is established through the eleventh spot of this emitter, since it is never necessary to enter the digit 11.

The connections from the lines 172 and 173 to the lines 174 will be explained with the assistance of the following table for the case in which the relay RX3 is energized.

TABLE III

|  | Pence product | Sterling product |
| --- | --- | --- |
| Units | 3 | 3 |
| Tens | 30 | 2 6 |
| Hundreds | 300 | 1 5 0 |
| Thousands | 3,000 | 12 10 0 |
| Ten thousands | 30,000 | 125 0 0 |
| Hundred thousands | 300,000 | 1250 0 0 |
| Millions | 3,000,000 | 12500 0 0 |
| Multiplier digit 3. | | |

Although the capacity of the multiplier register is eight denominations, the circuits for multiplying the remainder have only been shown for multiplication by an amount less than 10,000,000, and the capacity of the machine with regard to sterling multiplication, is thus only seven denominations in the multiplier. The necessary circuits for dealing with an eight-denominational multiplier can, however, be readily added. The above table shows the seven products which will be obtained with 3 as multiplier, both expressed in pence and converted into sterling.

From the above table it will be seen that the pence digit in the sterling product is either 3d., 6d., or 0d.

Figure 3F:
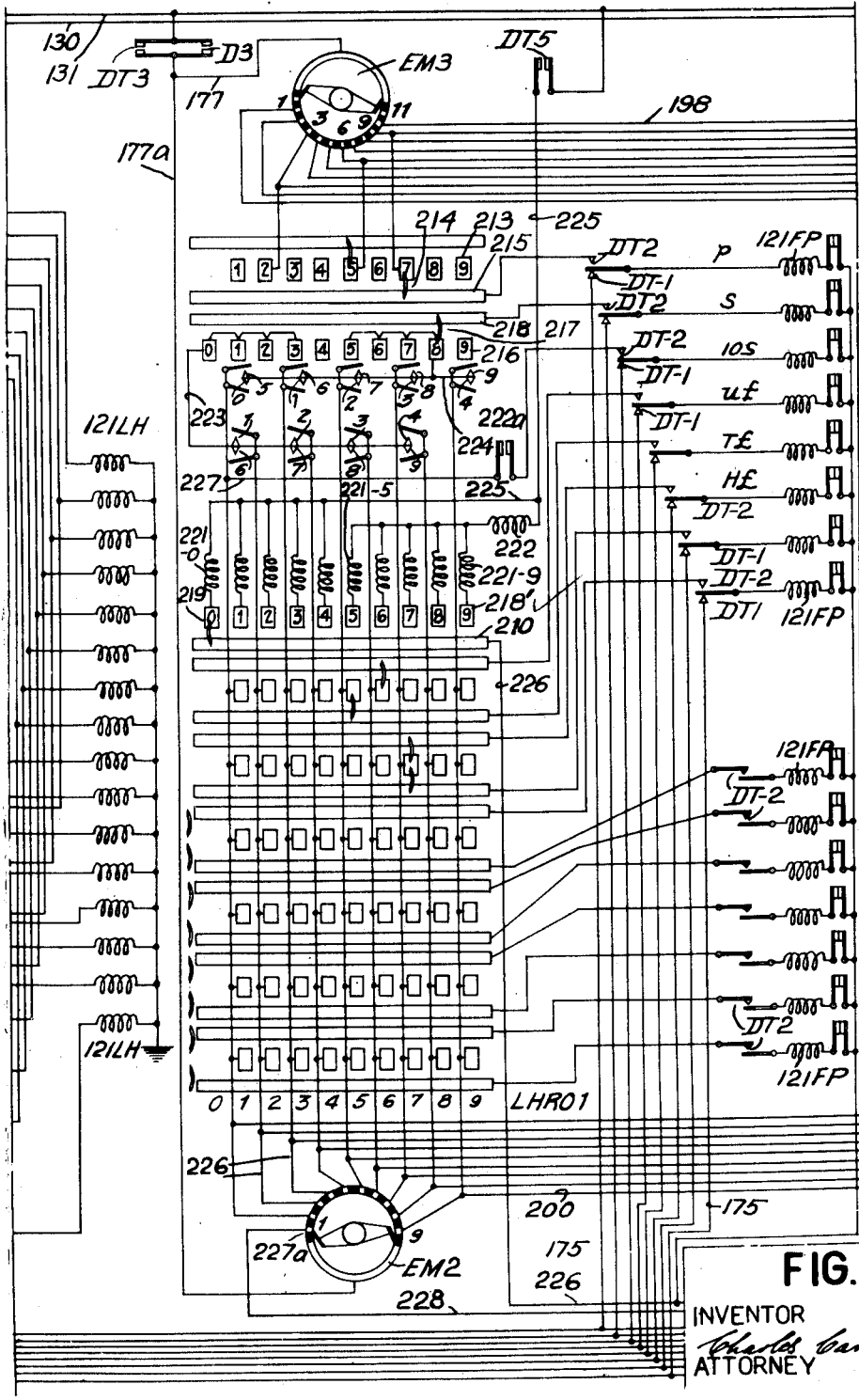
Figure 38:
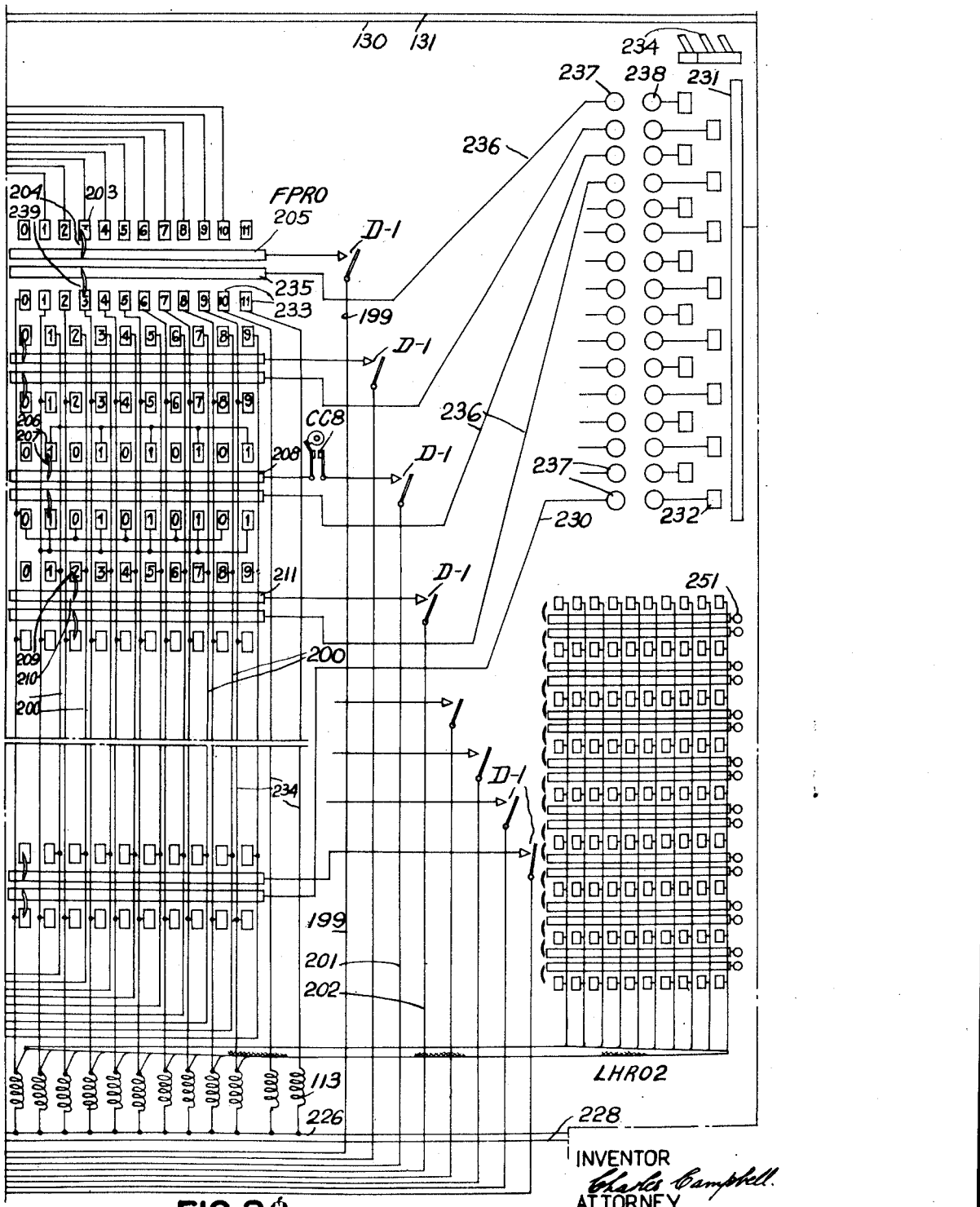

Referring now to Figure 3b a group of lines 176u to 176m, are connected to the pence line 174 and therefore to the pence (lowest) accumulator magnet 121FP, one at a time, in accordance with which of the relays RCS is energized. That is to say, if the relay RCSu is energized the line 176u will be connected to the pence line 174, and so on. The relay RX—3 closes contacts to connect the line 176u to the line 172—3 which is connected to the "three" spot of the emitter EM3, so that, with the relays RX3 and RCSu energized, a circuit will be completed extending through contacts R1 which are closed by the relay R (Figure 3a), a line 177, the emitter EM3 at the "three" time in the cycle, the line 172—3, the contacts RX—3, the line 176u, the contacts of the relay RCSu and the pence lines 174, 175, to the pence accumulator magnet 121FP (Figure 3f). This is the circuit which is established in the example shown in Table I, for entering the product 3d. in the accumulator FP. The relay RX—3 also has contacts for connecting the line 176t to the line 172—6 to transmit an impulse at the "six" time in the cycle. Thus if the relays RX3 and RCSt are energized, six pence (the pence digit of 2/6 which equals 30d.)

will be entered into the accumulator FP. The relay RX3 does not make any connections to the other lines of the group 176, since with 3 in the hundreds or a higher denomination as the multiplier, there are no pence in the product.

From Table III it will be seen that the digits in the pounds and shillings parts of the products are either 1, 2 or 5. The relay RX3 has contacts (Figure 3c) connecting the lines 173—1 and 173—2 and 173—5 to lines 178—1, 178—2 and 178—5 respectively. The latter lines will receive impulses from the emitter EM2 at the "one" "two" and "five" times in the cycle respectively.

When multiplying by a units digit there are no pounds or shillings to be entered, and no circuits are completed through the emitter EM2, but when multiplying by a tens digit, the relay RCS—t will be energized, and a line 179 will be connected to the units of shillings line 174. The line 179 is connected to the line 178—2 so that with the relay RX3 also energized, an impulse will be transmitted at the "two" time in the cycle, through the contacts R—1, a line 177a, the emitter EM2, the contacts of the relay RX3, the line 178—2, the line 179, the contacts of the relay RCSt, the units of shillings line 174, and the units of shillings accumulator-magnet 121FP. When the relay RCSh is energized, to allow multiplication by a digit in the hundreds denomination of the multiplier, a line 180 is connected to the units of shillings line 174, and a line 181 is connected to the tens of shillings line 174, while a line 182 is connected to the units pounds line 174. The line 180 is connected to the line 178—5 so that with the relays RX3 and RCSh energized, 5 will be entered into the units of shillings denomination of the accumulator FP. There is no connection from the line 181 to the contacts RX3, so that no circuit is completed when the relay RX3 is energized, through the tens of shillings denomination of the accumulator. The line 182 is connected to the line 178—1 so that, with the relays RX3 and RCSh energized 1 will be entered into the units pounds denomination of the accumulator.

In the same way, the relay RCSth connects lines 183, 184, 185 and 186 respectively to the units of shillings, the tens of shillings, the units of pounds and the tens of pounds lines 174. With relays RX3 and RCSth energized, nothing will be entered into units of shillings denomination, since there is no connection on the lines 183 to any of the contacts of the relay RX3, 1 will be entered into the tens of shillings denomination, since the line 184 is connected to the line 178—1, 2 will be entered into the units of pounds denomination, since the line 185 is connected to the line 178—2, and 1 will be entered into the tens of pounds denomination since the line 186 is connected to the line 178—1.

Similar circuits will be established when the relays RCS for the higher denominations are energized. These circuits can readily be traced, but it will be unnecessary to describe them in detail, since they are arranged in accordance with the same system as those already explained. Briefly, the relays RCS and RX selectively connect the lines 173 to the lines 174 in such manner that impulses are transmitted over the latter line at such times appropriate for entering the remainder product. The connections from the contacts of the remaining relays RX are arranged in accordance with the same system, and can readily be determined by preparing suitable tables similar to Table III above, and making the connection from the relay contacts to the lines 179, 180, etc. in accordance with such tables. The connections are shown in the circuit diagram but need not be traced in detail.

At the beginning of this machine cycle, the contacts CSu—1 were closed by the relays CSu, so as to energize the relay Yu—1. This relay in turn opens the contacts Yu—2 and closes the contacts Yu—3. The relays RCSu, CSu, RX3 and X3 will remain energized until the end of the cycle, when they become de-energized. At the end of the cycle the contacts CC2 again close momentarily to complete a circuit from the line 132 through the contacts CC—2, M—2, Yu—3, Yt—3 and Yh—2, the relays CSh and RCSh, the reading-out commutator associated with the hundreds denomination of the multiplier register, the line 171—6 and the relays RX6 and X6 in parallel. The machine then proceeds to multiply the decimal multiplicand 12.8625 by 600 and to enter the two partial products into the accumulators Lh and Rh, so that these accumulators will contain respectively 1433.4010 and 6322.6865 at the end of the second multiplying cycle.

The relay RCSh has connected the lines 176h, 180, 181 and 182 to the corresponding lines 174. There are, however, no connections from the lines 176h, and 180, to any of the contacts of the relay RX6. Thus, nothing will be entered into the pence or units of shillings denominations of the accumulator FP. Circuits will, however, extend through the emitter EM2, the line 173—1, a pair of contacts of the relay RX6, a line 187, a line 181, one of the lines 174 and the tens of shillings counter-magnet 121FP (Figure 3f). A second circuit will be established through the emitter EM2 (Figure 3c), the line 173—2, a pair of contacts of the relay RX6, a line 188, the line 182 and one of the lines 174 to the units of pounds accumulator-magnet 121FP. Thus, £2.10s.0d. will be entered into the final product of the accumulator to give a final total of £2.10s.3d. in that accumulator. This completes the multiplying operation.

During this cycle the relay Yh—1 will have been energized by the closure of the contacts CSh—1 (Figure 3a) by the relay CSh. The relay Yh will open its contacts Yh—2 and close its contacts Yh—3.

Each of the relays X1 to X9 and CSu to CStm remains energized for only one cycle, being mechanically restored to normal by the cams 65 and 65b of Figure 1a. Each of the relays RX and RCS also remains energized for only one cycle, and each such energized relay is restored to normal on the closure of cam contacts CC—5 (Figure 3b) which complete a reset circuit through the reset magnet of the relay. A typical circuit for the relay RCSu extends through the contacts CC—5, a line 191, a pair of contacts RCSu—1 of the relay RCSu, a holding coil 189 and the reset magnet RCSau of the relay, and a line 139. Only two of the reset magnets and circuits are shown in the circuit diagram, but it will be understood that there is one magnet and circuit for each relay. The reset magnet when thus energized resets the relay to its normal position, as previously explained. The holding relay 189 closes contacts 189a to provide a holding circuit through the line 190 and the contacts CC—5 so as to ensure that the reset magnet is energized sufficiently long for the relay to be properly reset.

Summing the partial products

When the cam contacts CC—2 close towards the end of the second multiplying cycle, they complete a circuit from the AC line 132, through the contacts CC—2, M—2, and all the contacts Y—3 in series, (closed by energization of their magnets Yu, Yt, etc. as explained above) a line 192, and then in parallel through a remainder control reset relay RCR, through contacts DC—3 closed by the relay DC and a doubling relay coil D, through the reset magnet 70MC of the multiplicand register, through a relay coil 193RH and through a closed switch 252, cam contacts FC10, which are now closed, and the reset magnet 70MP, of the multiplier register. The multiplier and multiplicand registers will thus be reset during the following machine cycle.

At this time cam contacts CC—4 (Figure 3b) are closed. The relay RCR closes contacts RCR—1 to complete a circuit extending from the line 131 through a line 254, the contacts CC—4, the contacts RCR—1, contacts RC—3, closed by one of the relays RC, a holding relay coil 283 and the reset magnets RCa of the relays RC. These relays are thus reset, the holding relay 283 closing its contacts 183a to ensure that the reset magnets are properly energized.

The magnet 193RH allows a group of contacts 193RH (Figure 3e) to close. This relay is of the type shown in Figure 13 of the patent to Cunningham, No. 1,933,714, aforesaid, and it will be sufficient to state that the contacts once closed remain closed until they are re-opened mechanically as an incident to the resetting of the accumulator RH. The closure of the contacts 193RH prepares a transfer circuit which extends through the emitter EM1 (Figure 3d), lines 196, the reading-out mechanism RHRO (Figure 3e), the contacts 193RH, lines 197, and the accumulator-magnets 121LH (Figure 3f). These transfer circuits are well known, and it is sufficient to state that the magnets 121LH are energized at such time as to add the amounts standing in the accumulator RH. This gives the complete decimal product in the accumulator LH, which will contain 7756.0875 in the example given in Table I.

The doubling relay D is of the kind shown in Figure 5. This relay closes contacts D—3 (Figure 3f) so as to connect the emitters EM2 and EM3 to the line 131. The relay D also closes a group of contacts D—1 (Figure 3g) so as to prepare a doubling circuit. It should be explained at this point that the emitters EM2 and EM3 are shown twice in the circuit diagram for the sake of clearness.

Taking the example shown in Table I in which the final product accumulator will contain £2. 10s. 3d., the doubling circuits are as follows. One circuit extends through the contacts D—3, the emitter EM3 at the "three" time in the cycle, one of a group of lines 198, the No. 3 pence segment 203 of the final product reading-out mechanism FPRO, a pence brush 204, and segment 205, one of the relay contacts D—1, a line 199, to the pence line 175 and contacts DT—1, and the pence accumulator-magnet 121FP. This will enter 3d. into the accumulator FP so that it will contain 6d. in the pence denomination at the end of the cycle.

In addition, a circuit extends through the contacts D—3, the line 177a, the emitter EM2 at the "one" time in the cycle, one of a group of lines 200, the one contact segment 206, brush 207 and common segment 208 of the reading-out commutator for the "tens of shillings" denomination of the accumulator FP, cam contacts CC—8, which close at the "one" time in the cycle only, one pair of the contacts D—1, a line 201, one of the lines 175, and contacts DT—1, to the "tens of shillings" counter-magnet 121FP. The accumulator will thus add 10s. It should be explained that the 10s. wheel of the accumulator FP is a decimal wheel and makes ten steps in turning through one revolution. It thus has five "zero" positions and five "one" positions, and is arranged to transfer after every alternate step of movement. Its brush 207 will thus represent "one" in any one of five positions and zero in any one of five other positions, so that there will be five segments 206 allocated to "one". These segments are connected together and by one of the lines 200 to the "one" spot on the emitter EM2. Thus, an impulse timed to represent 1, will pass through any one of the "one" segments 206. It should also be pointed out that no circuits are completed in respect of any denomination of the accumulator in which zero is registered.

A circuit is also completed through the emitter EM2 at the "two" time in the cycle and through the units of pounds commutator parts 209, 210 and 211, and a line 202 to the units of pounds accumulator-magnet 121FP. Thus, at the end of the cycle £2. 10s. 3d. will have been read out of the accumulator FP and re-entered into it, to give a total of £5. 0s. 6d.

After the right-hand partial product has been entered into the accumulator LH, the emitter EM1 engages with a special segment 212 to complete a circuit through contacts 193RH closed by the corresponding magnet, and the reset magnet 70RH of the accumulator RH. This accumulator will then be reset during the next cycle, and the contacts 193RH will be re-opened mechanically as an incident to the resetting operation. The contacts will be re-opened in time to prevent a second transfer of the right-hand partial product to the accumulator LH.

The relays DC and D are reset to their normal condition in the following manner: The relay D closes contacts D1, so that on the closure of contacts CC—5 after the doubling operation has been completed, the reset magnet Da of the relay D will be energized, together with a holding magnet 195. The magnet Da will reset the relay D and will itself be deenergized by the contacts CC—5 opening. The relay D also closes contacts D—2, so that when cam contacts CC—5 close a circuit will be completed through these contacts, contacts DC—2 already closed by the relay DC, the contacts D—2, a holding magnet 194 and the reset magnet DCa. The latter magnet resets the relay DC and is then deenergized together with its holding magnet 194 when the contacts CC—5 re-open. From Figure 4 it will be noted that the cam contacts CC—5 close and re-open before the cam contacts CC—2 close. The relays D and DC will not therefore be reset until the cam contacts CC—5 close in the cycle following that in which the relay D was energized.

The resetting of the multiplicand register MC, initiated in the manner explained above, results in the momentary opening of reset cam contacts MC—b (Figure 3h) which, it will be recalled, are in the holding circuit for the relays M, N, and R. These relays will thus have become de-energized. As a result of the de-energization of the relay M, the contacts M—2 will open and prevent any further circuits being established through the contacts Y—3 to the magnets RCR, 70MC, 193RH and 70MP. The de-energization of the relay N results in the contacts N1 (Figure 3h) closing.

While the register MC was being reset, contacts MC—a (Figure 3h) close so as to complete a circuit from the line 130 through a relay coil S, contacts MC—a and the line 169, to the line 131. The coil S closes contacts S—1 to provide a holding circuit for itself through cam contacts CC—1. Referring now to Figure 3a, on the closure of cam contacts CC—7, a circuit is completed from the AC line 132 through the now closed contacts S—2, to coil DT of a decimal to true relay. From Figure 4 it will be noted that the contacts MC—a make towards the end of the reset cycle, while the cam contacts CC—7 make at the beginning of the next cycle. The relay DT is of the type shown in Figure 5 and remains operative until its reset magnet DTa (Figure 3b) is energized on the closure of the cam contacts CC—5 in the manner previously explained.

The relay DT closes its contacts DT—2 and opens its contacts DT—1 so as to prepare a transfer circuit from the accumulator LH to the accumulator FP. The relay also closes contacts DT—3 to include the emitters EM2 and EM3 in circuit. As far as the pounds portion of the decimal product is concerned, the transfer circuits are conventional, and extend through the emitter EM2, the reading-out mechanism LHRO1, the contacts DT—2 and the accumulator-magnets 121FP. The decimals of pounds are, however, converted into shillings and pence, and entered into the accumulator in the latter form. The manner in which this is effected will now be explained.

It will be recalled that the decimal multiplicand is a multiple of 3d. so that the product of this multiplicand and the multiplier will also be a multiple of 3d. and its decimal portion will be in accordance with Table II above. Referring to this table, it will be noted that it is not necessary to take account of the digit in the fourth decimal place when determining the sterling equivalent of any decimal amount. The value of the pence in the sterling equivalent can be determined from inspection of the digits in the third decimal place. It will be seen that when this digit is zero, the pence digit is zero; when this digit is 2, the pence digit is 3; when this digit is 5 the pence digit is 6, and that when this digit is 7 the pence digit is 9.

Referring now to Figure 3f, the "two", "five" and "seven" segments 213 associated with the second denomination of the accumulator LH (that is, the denomination which registers the third decimal place) are connected respectively to the "three", "six" and "nine" conducting segments of the emitter EM3. In the example shown in Table I, the decimal amount is .0875, so that the brush 214 connects the "seven" contact 213 to the common segment 215. The transferring circuit extends from the line 131 through the contacts DT—3, the emitter EM3 at the "nine" time in the cycle, the "seven" segment 213, the brush 214, the segment 215, the uppermost pair of contacts DT—2 and the counter-magnet 121FP for the pence denomination; thus, ninepence will be added by the accumulator FP.

Referring again to Table II, it will be noted that the shillings value is even whenever the digit in the second decimal place is 0, 1, 2 or 3, but is odd whenever the digit is 5, 6, 7 or 8.

It will also be noted that the digits 0 and 5 in the first decimal place are both equivalent to either no shillings or 1s., the digits 1 and 6 in the first decimal place are equivalent to either 2s. or 3s., the digits 2 and 7 to either 4s. or 5s., the digits 3 and 8 to either 6s. or 7s., and the digits 4 and 9 to either 8s. or 9s. Which of the two alternatives should be taken in each case is determined by the value of the digit in the second decimal place by the rule given above. Finally, it will be noted that with the digits 5, 6, 7, 8 and 9 in the first decimal place, there will be 10s. in the sterling amount.

Referring now to Figure 3f, the "zero", "one", "two", and "three" segments 216, for the third denomination of the accumulator LH are connected together to a line 223, while the "five", "six", "seven" and "eight" segments 216 are connected together and to a line 224. This particular reading-out commutator determines whether an even or an odd value of shillings shall be entered into the accumulator FP. The various digital segments 218' of the fourth denomination of the accumulator are connected individually to an associated one of ten relay coils 221—0 to 221—9. The circuits through the coils 221—5 to 221—9 inclusive, include a coil 222. It will be appreciated that one of the coils 221 will be energized depending upon the position of the brush 219. As shown, the coil 221—0 is energized. Further, if the brush engages one of the "five" to "nine" segments 218', the circuit will also include the coil 222. In the example shown the circuit extends from the line 131 through the contacts DT—5 closed by the relay coil DT, the line 225, the coil 221—0, the "zero" segment 218', the brush 219, the common segment 220, and a line 226 to the line 130.

If the relay 222 is energized, a circuit is completed through the emitter EM2 at the "one" time in the cycle, the "one" line 223, a line 227, relay contacts 222a closed by the coil 222, the appropriate contacts DT—2 and the tens of shillings magnet 121FP. In the example shown in Table I, this circuit is not completed and no entry is made into the tens of shillings denomination of the accumulator.

The relays 221—0 and 221—5 have each a pair of contacts 0 and 5 respectively which are connected between the line 224 and the "one" line 226 which connects them to the "one" segment of the emitter EM2. Thus, if either one of these two relays is energized, and the brush 217 is engaged with the "five", "six", "seven" or "eight" segments 216, a circuit will be established. In the present case the relay 221—0 is energized, and the circuit extends from the emitter EM2 at the "one" time in the cycle, through the "one" line 226, contacts 0, the line 224, the "eight" segment 216, the brush 217, the common segment 218, the second pair of contacts DT2, and the units of shillings accumulator-magnet 121FP. The accumulator will thus add 1s.

The relays 221—1 and 221—6 have each a pair of contacts 1 and 6, respectively, connected between the "two" line 226 and the line 223 which is connected to the "zero", "one", "two" and "three" segments 216, and also have each a pair of contacts 1 and 6, respectively, connected between the "three" line 226 and the line 214 which is connected to the "five", "six", "seven" and "eight" segments 216. It will be seen that with either of the relays 221—1 or 221—6 energized, a circuit will be completed through the units of shillings counter-magnet 121FP, at the "two" time in the cycle if the brush 217 engages one of the "zero", "one", "two" and "three" segments 216, and at the "three" time in the cycle if the brush engages one of the "five", "six", "seven" and "eight" segments 216, so that in one case 2s. will be added and in the other case 3s. will be added, depending upon whether the digit in the second decimal place is 0, 1, 2 or 3 or is 5, 6, 7 or 8. This is in accordance with the rules given above. The contacts for the remaining relays 221 are shown in the circuit diagram and are designated with the digits to which they are related. These pairs of contacts are connected in circuit in the same way as those already described, and in accordance with the rules given above.

At the end of this cycle, the complete product is registered in the accumulator FP. The machine now proceeds automatically to record this product on the card, and card-feeding is restarted.

*Recording of products and resumption of card feed*

At this time contacts DT—4 are closed, and when the emitter EM2 has completed the transmission of impulses for transferring the decimal product to the accumulator FP, it makes contact with a conducting segment 227a, and completes a circuit from the line 131 through the contacts DT—3, the line 177a, the emitter EM2, the segment 227a, a line 228, the contacts DT—4 (Figure 3h), and the relay coil C to the line 130. The relay coil C closes its contacts C1 to maintain itself energized, and also closes the contacts C2. This completes the circuits previously explained through the card-feed clutch magnet 166, and a card-feeding cycle automatically follows, during which a pair of factors from the next card are read and entered into the machine.

Early in this card-feeding cycle, cam contacts FC—4 close and energize a relay coil B which closes contacts B—2 to maintain itself energized over a circuit which extends through the contacts B—2 and the contacts LH—a. The latter open when the accumulator LH is reset, and the circuits are so arranged that this does not occur until the product has been recorded and the card ejected. The relay B also closes its contacts B—1 to establish a connection from the line 131 through a group of contacts and switches 229 (the purpose of which need not now be explained) to a line 230 which is connected to a common strip 231 on a punch commutator. This commutator also includes a number of conducting segments 232, of which there is one for each column on a card, and which are connected to the common segment 231 by electrically-connected brushes 234. The brushes 234 are carried by the second card-rack and are moved with the card through the punching mechanism so as to connect the segment 231 to that one of the segments 232 which corresponds to the column of the card that is underneath the punches.

As previously explained, the reading-out mechanism FPRO comprises two sets of commutators. The set of commutators used for doubling the remainder product have already been explained. The second set includes segments 233 which are individually connected by lines 234, each to the punch-selecting magnet 113 corresponding in digital value to the segment. Thus, for example, each "three" segment 233 is connected to the punch-selecting magnet which selects the punch for punching a "three" hole. The common segments 235 of these commutators are connected by lines 236 to plug sockets 237. These plug sockets are connected to those plug sockets 238 corresponding to the columns on the card in which the product is to be recorded.

The recording operation is a conventional one, and it will be sufficient to trace the circuit by which the pence digit 3 is recorded. It should be noted, however, that the brushes are shown in the circuit diagram in the position assumed prior to the doubling operation and are not in the position assumed when the product is recorded. It happens that the pence brush 239 is in the same position at both stages of the operation. The circuit in question extends from the line 131 through contacts B1, the line 230, the common segments 231, the brush 233, the segment 232 associated with the column which is to receive the pence digit of the product, the connected sockets 238 and 237, the connected line 236, the pence common segment 235, brush 239 and "three" segment 233, the connected line 234 and the connected magnet 113 which selects a punch for perforating a hole in the "three" position of the column. The punch-selecting magnet when thus energized also brings about the closure of the contacts 114 so as to energize the punch-operating magnet 115 over a circuit extending through the contacts B—1, a line 240 and the punch-operating magnet 115. The other punch-selecting circuits are similar, but it should be noted that since the tens of shillings wheel has five zero and five 1 positions, it is necessary to connect all the zero segments 233 to the zero punch-selecting magnet, and all the No. 1 segments 233 to the "one" punch-selecting magnet. After the product has been recorded, the card is ejected in a known manner and the complete sequence of operations is repeated with the factors from the next card.

*General operation*

The sequence of operations will now be briefly summarized. Firstly, the machine performs a card-feeding cycle which comprises two machine cycles. In the first of these machine cycles, the multiplier is read and registered in the register MP and the pounds portion of the multiplicand is read and registered in the register MC. The shillings and pence portion of the multiplicand is registered in the translating mechanism, comprising the relays shown in the lower left-hand corner of Figure 3a. This mechanism determines the amount of the remainder and sets up the relays RC and DC accordingly. If there is no remainder the relays RC and DC will remain de-energized. If there is a penny remainder the relay RC will be energized, while if there is a two-penny remainder the relays RC and DC will be energized. During the second machine cycle comprised in a card-feeding cycle, the machine enters the decimal portion of the multiplicand into the register MC, calculating this portion from the shillings and pence amount set up.

The next operation is the resetting of the accumulators LH and FP, which is automatically initiated at the end of the card-feeding cycle, provided that the product has been recorded on the previous card and this card ejected. If this latter is not completed during the card-feeding cycle, the reset of the accumulators LH and FP is delayed in a known manner until it is completed.

The machine then proceeds to multiply the decimal multiplicand amount by the multiplier, and to accumulate two partial products in the accumulators LH and RH. Concurrently it multiplies 1d. by the multiplier and accumulates a sterling product in the accumulator FP. The number of multiplying cycles performed is equal to the number of significant figures in the multiplier, all cycles involving multiplication by zero being omitted. When there is no remainder, the multiplication of 1d. by the multiplier is omitted.

On the completion of multiplication, the right-hand partial product is read out of the accumulator RH and entered into the accumulator LH to give the complete decimal product. When the remainder is 2d. the amount in the accumulator FP is read out and re-entered into that accumulator, so as to double it and obtain in that accumulator the product of 2d. and the multiplier. This doubling operation is omitted when the remainder is 0d. or 1d. The next operation is the conversion of the decimal product in the accumulator LH to the sterling notation and its entry into the accumulator FP which will finally contain the complete product in the sterling notation. This product is then recorded on a card and concurrently another card-feed cycle is initiated and the next pair of factors read from the next card.

In certain cases it may be desired to multiply a number of multiplicands by the same multiplier. Instead of recording this multiplier on each of the cards containing the several multiplicands, it may be recorded on a special rate card which is inserted in the file in front of the multiplicand cards to which it relates. When one of these rate cards is read, the multiplier it contains is entered into the multiplier register MP which is not reset until the next rate card is read. This multiplier thus serves for all the multiplicands on the cards between the two rate cards. The manner in which the rate cards are distinguished and the reset of the multiplier is controlled is fully explained in the Cunningham United States Patent No. 1,933,714, and need not be described herein. The necessary circuits have, however, been shown in the circuit diagram.

The present machine may also be arranged to multiply two decimals together. To do this, plug-sockets 134 connected to the multiplicand reading brushes 109MP are connected directly to the socket 135 of the multiplicand register MC so that the amount read from the card is entered directly into this register. It will be appreciated that with this plugging, the sterling decimal translating mechanism will remain entirely inoperative, and that in consequence the remainder-multiplying mechanism will also remain inoperative, and nothing will be entered into the accumulator FP. It is necessary also to prevent the transfer of the decimal product from the accumulator LH to the accumulator FP, otherwise, a false result will be recorded. This may be effected by moving a switch 250 (Figure 3h) to the dotted line position shown, thereby disconnecting the contact MC—a from the relay S and connecting these contacts to the relay C. Thus, when the multiplicand register is reset, instead of the relay S being energized and in turn energizing the decimal to true relay DT, the relay C will be energized and will bring about a card-feeding operation, and concurrently therewith a product-recording operation. With this setting of the machine, the sockets 238 associated with the punching mechanism, are connected to sockets 251 associated with reading-out mechanism LHRO—2 in the accumulator LH. In this manner the product will be recorded under the control of the accumulator LH.

The machine just described not only calculates the amount expressed in a uniform notation and the remainder that is equivalent to an amount expressed in a non-uniform notation, but performs a subsequent calculation with the amounts it obtains and reconverts the result of the calculation into the non-uniform notation. The present invention, however, includes a calculating machine which only performs the first of these calculations. Such a machine might comprise, for example, a keyboard for entering the non-uniform amount, translating mechanism for converting the amount entered into a uniform amount and a remainder and punching mechanism for recording the converted uniform amount and remainder on a card. This card may then be employed to control a multiplying machine similar to that described herein except that no translating mechanism would be provided in it.

It will be appreciated that the unit of the converted uniform amount need not be the main unit of the non-uniform amount but could be a subordinate unit or an artificial unit. Thus in the case of sterling the conversion could be into decimals of a shilling. This conversion can be effected by converting the pence into decimals of a shilling and a remainder by means of translating mechanism similar to that described herein, entering the pounds, units of shillings and decimals of shillings into the multiplicand register, doubling the pounds amount by reading it out and then entering it again into the register and finally adding unity to the denomination receiving the units of pounds if the original amount contained ten shillings. When the shilling is adopted as the unit of the decimalized amount the product of the remainder and the multiplier would be expressed in shillings and pence which can be done by a less complex multiplying mechanism than that described herein. The final product which would be in shillings and pence, would then have to be converted into pounds, shillings and pence. It is, however, believed to be simpler to employ the pound as a unit when dealing with sterling amounts.

The employment of a subordinate unit as the unit of the decimalized amount may, however, be preferable when dealing with other notations. It will be appreciated that the remainder should be as small as possible in order to simplify the subsequent calculations. If it were required to multiply lengths involving yards, feet and inches, it would be preferable to decimalize the lengths in terms of feet and not yards since a remainder of one or two inches is obtained in the former case while, in the latter case, the remainder may be anything from one to eight inches.

Instead of converting the multiplicand (when it cannot be decimalized exactly) into the sum of a decimalizable amount and one penny or two pence, it can be converted into a decimalizable amount plus or minus one penny. The multiplying operations will occur as before with this modification to obtain the decimal product and the remainder product (if any) of one penny and the multiplier. The decimal product would then be transferred into an accumulator additional to those described herein and concurrently converted into the sterling notation. Finally, the remainder product transferred to the additional accumulator either additively or subtractively depending on whether the remainder was plus or was minus one penny.

I claim:—

1. A multiplying machine comprising in combination two decimal registers, a device for registering a remainder of one penny or twopence, means for entering a decimal factor into one of the registers, translating mechanism, means for entering a "sterling" factor into the translating mechanism, which translating mechanism is arranged to divide said factor into an amount which can be expressed exactly in the decimal notation and a remainder not exceeding twopence and to obtain and enter the decimal equivalent of said amount into the other register and to cause the remainder registering device to register the remainder, a decimal accumulator, multiplying mechanism for multiplying the amounts in the two registers and entering the product into the decimal accumulator, a "sterling" accumulator, additional multiplying mechanism for multiplying the factor in the first mentioned register and the remainder and entering the product into the "sterling" accumulator, and means for transferring the amount in the decimal accumulator into the "sterling" accumulator and simultaneously converting that amount into the "sterling" notation.

2. In a machine of the class described, means for sensing a record card for perforations representing a multiplier and a multiplicand, entry receiving devices controlled thereby multiplying mechanism controlled by said devices to effect multiplying of said multiplier and part of said multiplicand, an accumulator for receiving the result of the multiplication and means controlled by said sensing means for causing the doubling of the partial product standing in said accumulator.

3. In an electric multiplying machine, means for analyzing perforations in a record card representative of an amount expressed as a compound denominate number, translating means controlled thereby to receive said number and convert it into two numbers, one of which is a whole number representing the decimal equivalent of less than the original number and the other is a remainder in terms of the original notation, entry receiving devices, and means for entering said two numbers into said devices.

4. In a machine for handling amounts expressed in terms of a sterling notation, translating mechanism; means for entering a sterling amount therein, and entry receiving devices, controlled by said mechanism to receive a number representing the decimal equivalent of the sterling amount to the nearest even quarter-shilling and a number representing the remaining pence.

5. In a machine of the class described, translating mechanism, means for entering a number therein representing shillings and pence, means included in said translating mechanism for converting said entry into a decimal equivalent of pounds and a remainder of one penny or two pence, a plurality of entry receiving devices and means controlled by said translating mechanism for separately entering the decimal equivalent of pounds into one device and the pence into another device.

6. In a calculating machine, means for reading perforations in a record card representing a multiplier and a multiplicand said multiplicand being expressed in terms of pounds, shillings and pence, translating means for converting said multiplicand reading into a decimal expression representing pounds, shillings and quarter-shillings with or without a remainder representing one penny or two pence, separate multiplying mechanism for separately multiplying said decimal expression and said remainder by said multiplier to obtain separate products, and means for combining said separate products to form the complete product expressed in the terms of the multiplicand.

7. In a calculating machine, means for reading perforations in a record card representing a multiplier and a multiplicand expressed as a compound denominate number, translating means controlled by said reading means including a plurality of relays, a plurality of emitters for emitting digit representing impulses and contacts controlled by said relays to select from said impulses those representing the decimal equivalent of the multiplicand, said translating means also including relays to represent a duo-decimal remainder, means controlled by said translating means for separately multiplying said decimal amount and said remainder by said multiplier to obtain separate decimal and duo-decimal products, means for retranslating said decimal product into a duo-decimal amount and means for combining said amount with the duo-decimal product.

8. In a machine of the class described, means for sensing a record card for perforations representative of an amount in terms of shillings, a pair of emitters, one for emitting impulses representative of the units of decimal equivalents of pounds and the other for emitting impulses representative of the tens of decimal equivalents of pounds, a plurality of relays and related contacts, means controlled by said contacts for selecting the impulses corresponding to the decimal equivalent in terms of pounds of the shillings amount sensed and an entry receiving device controlled by said selected impulses to receive the selected decimal.

9. In a machine of the class described, means for sensing a record card for perforations representing a multiplier and a multiplicand whose value is 2, entry receiving devices controlled thereby, multiplying mechanism controlled by said devices to effect multiplication of the multiplier by 1, an accumulator controlled by said multiplying mechanism to receive the result of said multiplication and means controlled by said sensing means for causing the doubling of the said partial product standing in said accumulator whereby the resulting product will be 2 times the multiplier.

CHARLES CAMPBELL.